(12) United States Patent
Behabtu et al.

(10) Patent No.: US 11,608,417 B2
(45) Date of Patent: Mar. 21, 2023

(54) POLYSACCHARIDE-ELASTOMER MASTERBATCH COMPOSITIONS

(71) Applicant: NUTRITION & BIOSCIENCES USA 4, INC., Rochester, NY (US)

(72) Inventors: Natnael Behabtu, Wilmington, DE (US); Jeffrey S. Downey, Battersea (CA); Christian Peter Lenges, Wilmington, DE (US); Tizazu H. Mekonnen, Waterloo (CA)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 390 days.

(21) Appl. No.: 16/623,232

(22) PCT Filed: Jun. 27, 2018

(86) PCT No.: PCT/US2018/039702
§ 371 (c)(1),
(2) Date: Dec. 16, 2019

(87) PCT Pub. No.: WO2019/005927
PCT Pub. Date: Jan. 3, 2019

(65) Prior Publication Data
US 2020/0190270 A1    Jun. 18, 2020

Related U.S. Application Data

(60) Provisional application No. 62/527,369, filed on Jun. 30, 2017.

(51) Int. Cl.
| | |
|---|---|
| C08J 3/22 | (2006.01) |
| C08K 3/04 | (2006.01) |
| C08K 3/013 | (2018.01) |
| C08B 37/00 | (2006.01) |
| C08F 136/06 | (2006.01) |
| C08F 136/08 | (2006.01) |
| C08G 18/76 | (2006.01) |
| C08J 3/00 | (2006.01) |
| C08J 3/16 | (2006.01) |
| C08K 3/24 | (2006.01) |
| C08K 3/30 | (2006.01) |
| C08K 3/36 | (2006.01) |
| C08K 5/09 | (2006.01) |
| C08K 5/17 | (2006.01) |
| C08K 5/54 | (2006.01) |
| C08L 23/16 | (2006.01) |

(52) U.S. Cl.
CPC ............ *C08J 3/22* (2013.01); *C08B 37/0009* (2013.01); *C08F 136/06* (2013.01); *C08F 136/08* (2013.01); *C08G 18/7664* (2013.01); *C08J 3/005* (2013.01); *C08J 3/16* (2013.01); *C08K 3/013* (2018.01); *C08K 3/041* (2017.05); *C08K 3/042* (2017.05); *C08K 3/045* (2017.05); *C08K 3/24* (2013.01); *C08K 3/30* (2013.01); *C08K 3/36* (2013.01); *C08K 5/09* (2013.01); *C08K 5/17* (2013.01); *C08K 5/54* (2013.01); *C08L 23/16* (2013.01); *C08J 2305/00* (2013.01); *C08J 2307/00* (2013.01); *C08J 2309/02* (2013.01); *C08J 2309/06* (2013.01); *C08K 2003/309* (2013.01)

(58) Field of Classification Search
CPC ..... C08J 3/22; C08J 3/005; C08J 3/16; C08K 3/045; C08K 3/041; C08K 3/042; C08K 3/013; C08K 3/24; C08K 3/30; C08K 3/36; C08K 5/0917; C08K 5/54; C08G 18/7764

See application file for complete search history.

(56) References Cited

U.S. PATENT DOCUMENTS

| | | | |
|---|---|---|---|
| 3,673,136 A | 6/1972 | Buchanan et al. | |
| 3,830,762 A * | 8/1974 | Abbott | C08J 3/005 524/925 |
| 5,308,892 A | 5/1994 | Zickler et al. | |
| 5,405,898 A | 4/1995 | Sommese | |
| 5,702,942 A | 12/1997 | Leathers et al. | |
| 5,967,211 A | 10/1999 | Lucas et al. | |
| 6,107,372 A | 8/2000 | Sakamaki | |
| 7,000,000 B1 | 2/2006 | O'Brien | |
| 7,153,895 B2 | 12/2006 | Hochheiser et al. | |

(Continued)

FOREIGN PATENT DOCUMENTS

| | | | |
|---|---|---|---|
| EP | 2325026 A1 | 5/2011 | |
| EP | 2899213 A1 | 7/2015 | |

(Continued)

OTHER PUBLICATIONS

"The Glass Transition Temperature of Natural Rubber", Loadman, Journal of Thermal anaysis, 929-941. (Year: 1985).*

(Continued)

*Primary Examiner* — Edward J Cain

(57) ABSTRACT

Disclosed herein are polysaccharide-elastomer masterbatch compositions and processes for preparing the masterbatch compositions. One method comprises a step of a) mixing i) an aqueous polysaccharide dispersion, or ii) a basic aqueous polysaccharide solution, with a rubber latex solution containing a rubber component to form a mixture. The method further comprises the steps of: b) coagulating the mixture obtained in step a) to produce a coagulated mass; and c) drying the coagulated mass obtained in step b). The masterbatch compositions are useful in preparing rubber-containing articles.

18 Claims, No Drawings

(56) References Cited

U.S. PATENT DOCUMENTS

| | | |
|---|---|---|
| 7,247,663 B2 | 7/2007 | Kikuchi et al. |
| 7,531,073 B2 | 5/2009 | Barron et al. |
| 7,786,208 B2 | 8/2010 | Kondou |
| 7,825,185 B2 | 11/2010 | Kondou |
| 7,960,466 B2 | 6/2011 | Yamada et al. |
| 8,022,136 B2 | 9/2011 | Yano et al. |
| 8,642,757 B2 | 2/2014 | O'Brien et al. |
| 9,012,540 B2 | 4/2015 | Kamada |
| 9,080,195 B2 | 7/2015 | O'Brien et al. |
| 9,115,266 B2 | 8/2015 | Compton et al. |
| 9,139,718 B2 | 9/2015 | Paullin et al. |
| 9,278,988 B2 | 3/2016 | Kasat et al. |
| 2006/0127328 A1 | 6/2006 | Monsan et al. |
| 2009/0005811 A1 | 1/2009 | DuChesne et al. |
| 2009/0046274 A1 | 2/2009 | McHugh et al. |
| 2010/0003515 A1 | 1/2010 | Tanaka et al. |
| 2010/0022684 A1 | 1/2010 | Wallen et al. |
| 2010/0202684 A1 * | 8/2010 | Mattausch ............... G06T 7/11 382/164 |
| 2013/0203914 A1 | 8/2013 | Debnath et al. |
| 2013/0203917 A1 | 8/2013 | Harris et al. |
| 2013/0231417 A1 | 9/2013 | Vasseur et al. |
| 2013/0244287 A1 | 9/2013 | O'Brien et al. |
| 2013/0244288 A1 | 9/2013 | O'Brien et al. |
| 2014/0179913 A1 | 6/2014 | Paullin et al. |
| 2015/0033429 A1 | 2/2015 | Andrusyszyn et al. |
| 2015/0148458 A1 | 5/2015 | Koide et al. |
| 2015/0191550 A1 | 7/2015 | Mishra et al. |
| 2015/0232785 A1 | 8/2015 | Paullin et al. |
| 2015/0376348 A1 | 12/2015 | Weingart et al. |
| 2016/0122445 A1 | 5/2016 | Nambiar et al. |
| 2016/0362525 A1 | 12/2016 | Teasley et al. |
| 2017/0073477 A1 | 3/2017 | Nishiura et al. |
| 2017/0362345 A1 | 12/2017 | Behabtu et al. |

FOREIGN PATENT DOCUMENTS

| | | | |
|---|---|---|---|
| EP | 2781370 B1 | 9/2015 | |
| WO | 1997030103 A2 | 8/1997 | |
| WO | 2015094402 A1 | 6/2015 | |
| WO | 2015/195430 A1 | 12/2015 | |
| WO | 2016099598 A1 | 6/2016 | |
| WO | 2016106011 A1 | 6/2016 | |
| WO | 2016106068 A1 | 6/2016 | |
| WO | WO-2016106068 A1 * | 6/2016 | ......... C08B 37/0009 |
| WO | 2016126685 A1 | 8/2016 | |
| WO | 2016196022 A1 | 12/2016 | |
| WO | 2017003808 A1 | 1/2017 | |
| WO | 2018081263 A1 | 5/2018 | |

OTHER PUBLICATIONS

Nunes et al., 1999, Kautschuk und Gummi Kunststoffe_52_78//93.

Choi et al., 2016, Polymer Bulletin, vol. 73, No. 12, pp. 34533464.

International Preliminary Report on Patentability for PCT/US2018/039702, dated Dec. 31, 2019.

* cited by examiner

POLYSACCHARIDE-ELASTOMER MASTERBATCH COMPOSITIONS

CROSS-REFERENCE TO RELATED APPLICATIONS

This application is the National Stage application of International Application No. PCT/US2018/39702 (filed Jun. 27, 2018), which claims priority to and the benefit of U.S. Provisional Appl. No. 62/527,369 (filed Jun. 30, 20171, both of which prior applications are incorporated herein by reference in their entirety.

FIELD OF THE DISCLOSURE

The present disclosure is directed towards a polysaccharide-elastomer masterbatch, and methods of making the masterbatch. The polysaccharide-elastomer masterbatch is useful in preparing rubber compositions, for example compositions useful in making articles such as tires, belts, seals, footwear, coatings, films, or adhesives.

BACKGROUND

Rubber compositions are typically reinforced with particulates such as carbon black and silica to improve the performance characteristics and also to reduce cost. Such rubber compositions are extensively used in various applications ranging from tires to belts to footwear, because of their excellent static and dynamic mechanical, physical, and thermal properties.

There is growing interest in replacing or complementing the carbon black in rubber compositions with renewable fillers such as cellulosic fibers or enzymatically-produced polysaccharides. Besides renewability, such materials can offer an improved environmental footprint over that associated with the process of producing carbon black from oil and gas, and reduced energy consumption in the processing of rubber with the filler. For example, tire manufacturers are interested in rubber compositions which provide low rolling resistance, high wet traction, and long life time. There is also significant interest in rubber compositions which can provide energy savings through better processability, lighter weight, reduced cost, and inclusion of renewable ingredients without compromising the performance.

There is a growing need for renewable materials which can replace incumbent ingredients in rubber compositions while providing improved properties, such as reduced rolling resistance. There is a growing need for methods of preparing rubber compositions containing renewable materials, including methods of preparing rubber-polysaccharide compositions which contain very low amounts of water, or which are essentially free of water. There is a growing need for methods to prepare rubber-polysaccharide masterbatch compositions.

SUMMARY

Disclosed herein are methods of producing a polysaccharide-elastomer masterbatch composition. In one embodiment, the method comprises a step of:
a) mixing
  i) an aqueous polysaccharide dispersion, or
  ii) a basic aqueous polysaccharide solution,
with a rubber latex solution containing a rubber component, and optionally a flocculant, to form a mixture.

In one embodiment, the method further comprises the steps of:
b) coagulating the mixture obtained in step a) to produce a coagulated mass; and
c) drying the coagulated mass obtained in step b), optionally while applying mechanical pressure to the coagulated mass.

In one embodiment, step b) coagulating the mixture comprises adding an inorganic salt to the mixture. In another embodiment, step b) coagulating the mixture comprises adding an acid to the mixture. In an additional embodiment, the mixing step further comprises adding a filler. In some embodiments, the method can further comprise adding a coupling agent.

In one embodiment, the polysaccharide of the aqueous polysaccharide dispersion or the basic aqueous polysaccharide solution comprises:
  i) poly alpha-1,3-glucan;
  ii) poly alpha-1,3-1,6-glucan;
  iii) water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000; or
  iv) a poly alpha-1,3-glucan ester compound represented by Structure I:

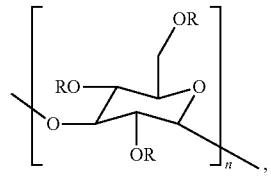

Structure I wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the compound has a degree of substitution with the first group of about 0.001 to about 3.

The polysaccharide of the aqueous polysaccharide dispersion can be in the form of wet cake, a colloidal dispersion, fibrids, dry powder, or a combination thereof.

In one embodiment, the rubber component of the rubber latex solution comprises at least one diene-based sulfur-vulcanizable or peroxide-vulcanizable elastomer having a Tg below −30° C., as determined by dynamic mechanical analysis. In another embodiment, the elastomer comprises natural rubber, synthetic polyisoprene, styrene butadiene rubber, ethylene propylene diene monomer rubber, hydrogenated nitrile butadiene rubber, polybutadiene, or neoprene.

Also disclosed herein are polysaccharide-elastomer masterbatch compositions produced according to the method disclosed herein, as well as articles produced using the polysaccharide-elastomer masterbatch compositions. In one embodiment, a polysaccharide-elastomer masterbatch composition is produced according to a method as disclosed herein, wherein the masterbatch composition comprises from about 20 weight percent to about 80 weight percent polysaccharide, based on the weight of polysaccharide and rubber component. In some embodiments, the article is a tire, a belt, a seal, footwear, a valve, tubing, a mat, a gasket, a coating, a film, or an adhesive.

DETAILED DESCRIPTION

All patents, patent applications, and publications cited herein are incorporated herein by reference in their entirety.

As used herein, the term "embodiment" or "disclosure" is not meant to be limiting, but applies generally to any of the embodiments defined in the claims or described herein. These terms are used interchangeably herein.

In this disclosure, a number of terms and abbreviations are used. The following definitions apply unless specifically stated otherwise.

The articles "a", "an", and "the" preceding an element or component are intended to be nonrestrictive regarding the number of instances (i.e. occurrences) of the element or component. There "a", "an", and "the" should be read to include one or at least one, and the singular word form of the element or component also includes the plural unless the number is obviously meant to be singular.

The term "comprising" means the presence of the stated features, integers, steps, or components as referred to in the claims, but that it does not preclude the presence or addition of one or more other features, integers, steps, components, or groups thereof. The term "comprising" is intended to include embodiments encompassed by the terms "consisting essentially of" and "consisting of". Similarly, the term "consisting essentially of" is intended to include embodiments encompassed by the term "consisting of".

Where present, all ranges are inclusive and combinable. For example, when a range of "1 to 5" is recited, the recited range should be construed as including ranges "1 to 4", "1 to 3", 1-2", "1-2 and 4-5", "1-3 and 5", and the like.

As used herein in connection with a numerical value, the term "about" refers to a range of +/−0.5 of the numerical value, unless the term is otherwise specifically defined in context. For instance, the phrase a "pH value of about 6" refers to pH values of from 5.5 to 6.5, unless the pH value is specifically defined otherwise.

It is intended that every maximum numerical limitation given throughout this Specification includes every lower numerical limitation, as if such lower numerical limitations were expressly written herein. Every minimum numerical limitation given throughout this Specification will include every higher numerical limitation, as if such higher numerical limitations were expressly written herein. Every numerical range given throughout this Specification will include every narrower numerical range that falls within such broader numerical range, as if such narrower numerical ranges were all expressly written herein.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The terms "rubber", "rubber component", and "elastomer" may be used interchangeably, unless expressly indicated otherwise. The terms "rubber compound", "compounded rubber" and "rubber composition" may be used interchangeably to refer to "rubber that has been blended or mixed with various ingredients and materials".

The terms "cure" and "vulcanize" may be used interchangeably unless otherwise indicated. Rubber compounds are typically cured using sulfur or peroxide-based curing agents. Typical sulfur-based curing agents for rubber compounds include elemental sulfur, sulfur-containing resins, sulfur-olefin adducts, and cure accelerators.

The term "phr" refers to parts by weight of a respective material per 100 parts by weight of rubber.

The terms "percent by volume", "volume percent", "vol %" and "v/v %" are used interchangeably herein. The percent by volume of a solute in a solution can be determined using the formula: [(volume of solute)/(volume of solution)]×100%.

The terms "percent by weight", "weight percentage (wt %)" and "weight-weight percentage (% w/w)" are used interchangeably herein. Percent by weight refers to the percentage of a material on a mass basis as it is comprised in a composition, mixture or solution.

The terms "increased", "enhanced" and "improved" are used interchangeably herein. These terms may refer to, for example, a quantity or activity that is at least 1%, 2%, 3%, 4%, 5%, 6%, 7%, 8%, 9%, 10%, 20%, 30%, 40%, 50%, 60%, 70%, 80%, 90%, 100%, 125%, 150%, 175%, or 200% (or any integer between 1% and 200%) more than the quantity or activity for which the increased quantity or activity is being compared.

The phrase "water insoluble" means that less than 5 grams of the substance, for example, the alpha-(1,3-glucan) polymer, dissolves in 100 milliliters of water at 23° C. In other embodiments, water insoluble means that less than 4 grams or 3 grams or 2 grams or 1 grams of the substance is dissolved in water at 23° C.

As used herein, the term "polysaccharide" means a polymeric carbohydrate molecule composed of long chains of monosaccharide units bound together by glycosidic linkages and on hydrolysis give the constituent monosaccharides or oligosaccharides.

As used herein, the term "masterbatch composition" refers to a solid product in which a desired component is optimally dispersed at high concentration in a carrier material. In a masterbatch composition, the carrier material is compatible with the main elastomer in which it will be blended during compounding, whereby the final elastomer product obtains the component and its properties from the masterbatch. For the masterbatch compositions disclosed herein, the desired component is at least one polysaccharide and the carrier material is at least one rubber component derived from a rubber latex solution; use of the polysaccharide-elastomer masterbatch compositions disclosed herein provides the property benefits of the polysaccharide, for example its effect as a reinforcing filler, to the final article comprising a rubber composition made from the masterbatch composition.

As used herein, "weight average molecular weight" or "$M_w$" is calculated as $M_w = \Sigma N_i M_i^2 / \Sigma N_i M_i$; where $M_i$ is the molecular weight of a chain and $N_i$ is the number of chains of that molecular weight. The weight average molecular weight can be determined by technics such as static light scattering, gas chromatography (GC), high pressure liquid chromatography (HPLC), gel permeation chromatography (GPC), small angle neutron scattering, X-ray scattering, and sedimentation velocity.

As used herein, "number average molecular weight" or "$M_n$" refers to the statistical average molecular weight of all the polymer chains in a sample. The number average molecular weight is calculated as $M_n = \Sigma N_i M_i / \Sigma N_i$ where $M_i$ is the molecular weight of a chain and $N_i$ is the number of chains of that molecular weight. The number average molecular weight of a polymer can be determined by technics such as gel permeation chromatography, viscometry via the (Mark-Houwink equation), and colligative methods such as vapor pressure osmometry, end-group determination or proton NMR.

The present disclosure is directed to polysaccharide-elastomer masterbatch compositions comprising a polysaccharide and a rubber component, and methods of producing the polysaccharide-elastomer masterbatch compositions. Methods of making an essentially water-free masterbatch composition from wet polysaccharide and latex solution are disclosed. The polysaccharide-elastomer masterbatch compositions can be useful in making rubber-containing articles such as tires, tire tread, tire sidewalls, power transmission belts, conveyor belts, hoses, soles of footwear, gaskets, or as a component in other rubber composites. The rubber compositions can also be used in a coating, a film, or an adhesive.

The present disclosure is directed to a method of producing a polysaccharide-elastomer masterbatch composition, the method comprising a step of:

a) mixing
   i) an aqueous polysaccharide dispersion, or
   ii) a basic aqueous polysaccharide solution,
with a rubber latex solution containing a rubber component, and optionally a flocculant, to form a mixture. In one embodiment, the mixing is performed under high shear to provide good dispersion of the polysaccharide and latex components.

In some embodiments, the mixing step further comprises adding a filler, whereby a masterbatch composition is produced which comprises the polysaccharide, the rubber component, and the filler. Depending on their effect on the mechanical performance of rubber compositions, fillers can be classified as reinforcing, semi-reinforcing, or non-reinforcing (extending). While reinforcing fillers improve the mechanical properties of rubber compositions, non-reinforcing fillers simply act as diluents, and semi-reinforcing fillers perform both functions to some extent. The effect of fillers on rubber compositions is related to the intrinsic properties of the filler, for example the particle size, size distribution, shape, and the interfacial interaction between the rubber polymer/elastomer and the filler. Although carbon black is the dominant filler used in the rubber industry due to its reinforcing effect, other fillers such as carbonates, clays, silicas, silicates, talc, and titanium dioxide are also used. In some embodiments, in a polysaccharide-rubber composition made from a masterbatch composition as disclosed herein, the polysaccharide functions as a non-reinforcing filler and has little effect on the mechanical properties of the rubber composition, as compared to the mechanical properties of the same rubber composition except lacking the polysaccharide. As a non-reinforcing filler, the polysaccharide may provide light weighting to the rubber composition. In other embodiments, in a polysaccharide-rubber composition made from a masterbatch composition as disclosed herein, the polysaccharide functions as a reinforcing filler and provides improved mechanical properties of the rubber composition, as compared to the mechanical properties of the same rubber composition except lacking the polysaccharide.

In some embodiments, the mixing step further comprises adding a flocculant, whereby a masterbatch composition is produced which comprises the polysaccharide, the rubber component, and the flocculant. Types of flocculant which can be used include cationic and anionic polymers such as carboxymethyl cellulose, carboxymethyl poly alpha-1,3-glucan, polyacrylic acid, polyacrylamide, and poly(maleic anhydride-alt-1-octadecene). The purpose of the flocculant is to increase the polysaccharide loading in the masterbatch. The flocculant is typically a water-soluble polymer that is stable under basic conditions but flocculates in acidic conditions or high salt concentrations. This behavior would allow for the simultaneous flocculation of the polysaccharide filler during the latex coagulation.

The method further comprises the steps of:

b) coagulating the mixture obtained in step a) to produce a coagulated mass; and c) drying the coagulated mass obtained in step b), optionally while applying mechanical pressure to the coagulated mass.

The dried coagulated mass, also referred to herein as a masterbatch composition, can have very low water content. In some embodiments, the masterbatch composition is essentially free of water. The masterbatch composition provides a convenient way to incorporate a desired polysaccharide into a selected rubber component with excellent dispersibility and compatibility. The phase behavior of blends of polysaccharides and rubber components shows compatibility when the polysaccharides and the rubber components form physical entanglement and chemical interaction. Using a masterbatch composition to prepare additional rubber compositions is advantageous in that it provides an easy and convenient method of combining polysaccharides such as poly alpha-1,3-glucan with rubber components while avoiding the need to handle and dispose of the water which can be contained in polysaccharides, for example in the wet cake form.

In some embodiments, the method can further comprise adding a coupling agent. In some embodiments, the mixing step further comprises adding at least one coupling agent, whereby a masterbatch composition is produced which comprises the polysaccharide, the rubber component, and the coupling agent. In some embodiments, the coagulating step further comprises adding at least one coupling agent. In some embodiments, at least one coupling agent is added to the masterbatch composition as it is used to formulate a compounded rubber-polysaccharide material.

In the mixing step, the polysaccharide can be provided as an aqueous polysaccharide dispersion or as a basic aqueous polysaccharide solution. In one embodiment, the polysaccharide in the aqueous dispersion comprises polysaccharide particles having an average particle size in at least one dimension in the range of from about 20 nm to about 200 μm (200,000 nm). For example, the average particle size in at least one dimension can be 20; 30; 40; 50; 60; 70; 80; 90; 100; 150; 200; 250; 300; 350; 400; 450; 500; 550; 600; 700; 800; 900; 1000; 1500; 2000; 2500; 5000; 7500; 10,000; 15,000; 20,000; 30,000; 40,000; 50,000; 60,000; 70,000;

80,000; 90,000; 100,000; 125,000; 150,000; 175,000; or 200,000 (or any value between 20 and 200,000) nm. In a further embodiment, the polysaccharide comprises particles having an average particle size in at least one dimension in the range of from about 20 nm to about 200 μm (200,000 nm) and an aspect ratio of about 1.

To prepare an aqueous polysaccharide dispersion, the polysaccharide can be first dispersed under high shear mixing in water in an amount of from about 1 weight percent to about 90 weight percent total solids. For example, the polysaccharide can be dispersed in water in an amount of about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, or 90 weight percent total solids. In some embodiments, the polysaccharide can be dispersed in water in an amount of from about 1 wt % to about 20 wt %, or from about 5 wt % to about 20 wt %, or from about 5 wt % to about 15 wt %. Typically at such concentrations, a very noticeable viscosity increase can be observed as the polysaccharide is dispersed, resulting in a slurry with a "smoothie-like" consistency.

The polysaccharide of the aqueous polysaccharide dispersion can be in the form of a colloidal dispersion, wet cake, fibrids, dry powder, or a combination thereof. By dry powder is meant polysaccharide containing less than about 5% by weight of water, which can be obtained by drying wet cake in a vacuum oven followed by milling. In one embodiment, in the aqueous polysaccharide dispersion the polysaccharide can be used in the form of a colloidal dispersion. As used herein, the term "colloidal dispersion" refers to a heterogeneous system having a dispersed phase and a dispersion medium, i.e., microscopically dispersed insoluble particles are suspended throughout another substance, for example water or an aqueous solution. An example of a colloidal dispersion in water is a hydrocolloid. The colloidal dispersion may be a stable colloidal dispersion or an unstable colloidal dispersion. The stable colloidal dispersion is stable at room temperature and/or at elevated temperature, for example, between 40 and 50° C. for a period of at least one month with no visible settling. The unstable dispersion, under the same conditions, may see at least a portion of the polysaccharide settle out of the dispersion. Agitation of the settled material will generally re-form the colloidal dispersion. In some embodiments, the colloidal dispersion is a stable dispersion. In other embodiments, the colloidal dispersion is an unstable dispersion. Colloidal dispersions of polysaccharides such as poly alpha-1,3-glucan or poly alpha-1,3-1,6-glucan can be prepared by dispersing the wet cake in water to form a polysaccharide colloidal dispersion, for example as disclosed in published patent application WO 2016/126685, the disclosure of which is incorporated herein by reference in its entirety.

In another embodiment, the polysaccharide of the aqueous polysaccharide dispersion can be in the form of a wet cake, for example containing greater than 5% by weight of water. A glucan wet cake is formed from a glucan colloidal dispersion by removing water by filtration. Water remains on the surface of glucan solid particles and trapped between particles. Whereas the glucan colloidal dispersion is a pourable liquid, the wet cake has a soft solid-like consistency. The term "poly alpha-1,3-glucan wet cake" herein refers to poly alpha-1,3-glucan that has been separated from a slurry and washed with water or an aqueous solution. Poly alpha-1,3-glucan or other polysaccharide is not dried when preparing a wet cake.

In yet another embodiment, the polysaccharide of the aqueous polysaccharide dispersion can be in the form of fibrids. The term "fibrids", as used herein, means nongranular, fibrous or film-like particles with at least one of their three dimensions being of minor magnitude relative to the largest dimension. In some embodiments, the polysaccharide can have a fiber-like and/or a sheet-like structure with a relatively large surface area when compared to a fiber. The surface area can be in the range of 5 to 50 meter$^2$/gram of material, with the largest dimension particle size of about 10 to 1000 micrometers and the smallest dimension size, length or thickness of 0.05 to 0.25 micrometers, resulting in an aspect ratio of largest to smallest dimension of 40 to 20,000. The terms "fibrids" and "polysaccharide fibrids" are used interchangeably herein. Poly alpha-1,3-glucan fibrids and methods for making them are disclosed in published patent application WO 2016/196022, the disclosure of which is incorporated by reference herein in its entirety.

These fibrids can be prepared by precipitation of a solution of polymeric material such as poly alpha-1,3-glucan or other polysaccharide using a non-solvent under shear, preferably, high shear. The term "non-solvent" as used herein means that it is a poor solvent for the polymeric material, for example, the polymeric material has a solubility of less than 5 wt % in the solvent. In other embodiments, the polymeric material can have a solubility of less than 4, 3, 2, 1 or 0.5 wt % in the solvent. Examples of suitable non-solvents for the poly alpha-1,3-glucan or other polysaccharide include, for example, methanol, ethanol, isopropanol, acetone, aqueous acidic solution, water, etc.

Polysaccharide fibrids can be made by a process comprising:
(a) dissolving poly alpha-1,3-glucan or other polysaccharide in a solvent to make a poly alpha-1,3-glucan or other polysaccharide solution;
(b) precipitating poly alpha-1,3-glucan fibrids or other polysaccharide fibrids under shear to produce a suspension containing the fibrids.

Fibrids can also be made by the addition of a poly alpha-1,3-glucan solution or other polysaccharide solution into a precipitating bath of liquid ("non-solvent"). The addition of the poly alpha-1,3-glucan solution or other polysaccharide solution into the precipitating bath can be accomplished using any standards methods known to those skilled in the art. For example, direct injection can be used.

During the addition, the stream of polymer solution is subjected to shearing forces and turbulence causing the fibrids to precipitate in the form of a suspension by using a non-solvent (i.e., a liquid that has a solubility for the poly alpha-1,3-glucan or other saccharide of less than 5 wt %), in other words, that is immiscible with poly alpha-1,3-glucan or other saccharide. In some embodiments, the precipitating bath can comprise acid or alkali aqueous solution or alcohol.

It is possible to control (i) the viscosity of the suspension containing fibrids (ii) the size and/or (iii) the shape of the fibrids by controlling one or more process parameters such as, for example, the dope concentration, the type of solvent, the type of mixer, the mixing speed, the pH of precipitation bath, the rate of addition of the solution containing polymer, the amount of non-solvent used, the duration of mixing, the neutralization rate and the concentration of neutralizer. The term "dope" as used herein refers to solution containing polymer. A dope can be prepared by mixing polymer into a solvent. Thus, as well known to those skilled in the art, dope concentration refers to the amount of polymer mixed into the solvent.

The fibrids can be isolated by filtering the suspension. Optionally, the isolated fibrids can be washed with water and/or dried. It is believed that it is possible to re-suspend the dried fibrids either by adding a component such as carboxymethyl cellulose and the like or by functionalizing the fibrids by adding certain groups that would facilitate resuspension in a liquid.

Types of solvent for the poly alpha-1,3-glucan or other polysaccharide that can be used include, but are not limited to, an aqueous basic solution containing components such as sodium hydroxide, potassium hydroxide, lithium hydroxide, lithium chloride/DMAC, or DMSO/lithium chloride. The solvent should be miscible with the liquid used for the precipitation bath. The mixing speed and the duration of mixing can be adjusted as desired. The pH of the precipitation bath can be adjusted from acidic to neutral to basic depending upon the solvent chosen.

Alternatively, in the mixing step the polysaccharide can be provided as a basic aqueous polysaccharide solution. In one embodiment, the polysaccharide may be solubilized in a range of from about 1 to about 13 weight percent in basic solution, for example about 4.5 wt % NaOH solution, under high shear mixing. To prepare a basic aqueous polysaccharide solution, an aqueous polysaccharide dispersion can be prepared with the desired amount of polysaccharide, and then a calculated quantity of base such as NaOH can be added. Preparation of basic aqueous polysaccharide solution is disclosed, for example, in published patent application US 2015/0191550 A1. Aqueous solutions containing sodium hydroxide, potassium hydroxide, lithium hydroxide, lithium chloride/N,N-dimethyacetamide, or tetraethyl ammonium hydroxide in a concentration sufficient to dissolve the polysaccharide can be used. The solvent compositions include but are not limited to aqueous NaOH (where the NaOH concentration typically ranges from 4 to 6 wt %), aqueous KOH (typically 7.5-10 wt % in water), and aqueous tetraethyl ammonium hydroxide (typically 20 wt %). A typical solution composition using aqueous bases can be 10% polymer, 6.8% KOH and the rest water, or 10% polymer, 4% NaOH and the rest water, or 7% polymer, 18.5% tetraethyl ammonium hydroxide, and the rest water. The polysaccharide polymer can be mixed into the solvent by application of shear. For aqueous solvent systems, a slurry of the polysaccharide polymer in water can be made, followed by addition of concentrated aqueous base. The polysaccharide polymer can be completely dried before use, or the moisture content in the polysaccharide polymer can be measured and accounted for in the solution preparation.

The polysaccharide of the aqueous polysaccharide dispersion, or of the basic aqueous polysaccharide solution, comprises
  i) poly alpha-1,3-glucan;
  ii) poly alpha-1,3-1,6-glucan;
  iii) water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000; or
  iv) a poly alpha-1,3-glucan ester compound represented by Structure I:

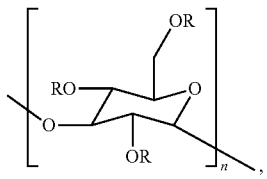

Structure I wherein
  (A) n is at least 6;
  (B) each R is independently an —H or a first group comprising —CO—$C_x$—COOH, wherein the —$C_x$— portion of said first group comprises a chain of 2 to 6 carbon atoms; and
  (C) the compound has a degree of substitution with the first group of about 0.001 to about 3.

Mixtures of these polysaccharides can also be used.

In one embodiment, the polysaccharide comprises poly alpha-1,3-glucan. The terms "poly alpha-1,3-glucan", "alpha-1,3-glucan polymer" and "glucan polymer" are used interchangeably herein. The term "glucan" herein refers to a polysaccharide of D-glucose monomers that are linked by glycosidic linkages. Poly alpha-1,3-glucan is a polymer comprising glucose monomeric units linked together by glycosidic linkages, wherein at least 50% of the glycosidic linkages are alpha-1,3-glycosidic linkages. Poly alpha-1,3-glucan is a type of polysaccharide. The structure of poly alpha-1,3-glucan can be illustrated as shown in Structure II:

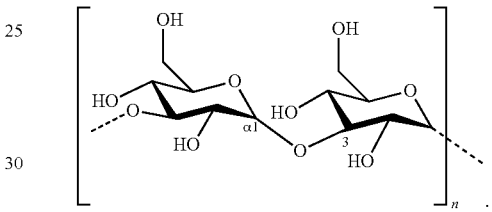

Structure II

The poly alpha-1,3-glucan can be prepared using chemical methods, or it can be prepared by extracting it from various organisms, such as fungi, that produce poly alpha-1,3-glucan. Alternatively, poly alpha-1,3-glucan can be enzymatically produced from sucrose using one or more glucosyltransferase (gtf) enzymes, as described in U.S. Pat. Nos. 7,000,000; 8,642,757; and 9,080,195, for example. Using the procedures given therein, the polymer is made directly in a one-step enzymatic reaction using a recombinant glucosyltransferase enzyme, for example the gtfJ enzyme, as the catalyst and sucrose as the substrate. The poly alpha-1,3-glucan is produced with fructose as the by-product. As the reaction progresses, the poly alpha-1,3-glucan precipitates from solution.

The process to produce poly alpha-1,3-glucan from sucrose using, for example, a glucosyl transferase enzyme, can result in a slurry of the poly alpha-1,3-glucan in water. The slurry can be filtered to remove some of the water, giving the solid poly alpha-1,3-glucan as a wet cake containing in the range of from 30 to 50 percent by weight of poly alpha-1,3-glucan, with the remainder being water. In some embodiments, the wet cake comprises in the range of from 35 to 45 percent by weight of the poly alpha-1,3-glucan. The wet cake can be washed with water to remove any water soluble impurities, for example, sucrose, fructose, or phosphate buffers. In some embodiments, the wet cake comprising the poly alpha-1,3-glucan can be used as is. In other embodiments, the wet cake can be further dried under reduced pressure, at elevated temperature, by freeze drying, or a combination thereof, to give a powder comprising greater than or equal to 50 percent by weight of the poly alpha-1,3-glucan. In some embodiments, the poly alpha-1,3-glucan can be a powder, comprising less than or equal to 20 percent by weight water. In other embodiments, the poly alpha-1,3-glucan can be a dry powder comprising less than or equal to 15, 14, 13, 12, 11, 10, 9, 8, 7, 6, 5, 4, 3, 2, or 1 percent by weight water.

In some embodiments, the percentage of glycosidic linkages between the glucose monomer units of the poly alpha-1,3-glucan that are alpha-1,3 is greater than or equal to 50%, 60%, 70%, 80%, 90%, 95%, 96%, 97%, 98%, 99%, or 100% (or any integer value between 50% and 100%). In such embodiments, accordingly, poly alpha-1,3-glucan has less than or equal to 50%, 40%, 30%, 20%, 10%, 5%, 4%, 3%, 2%, 1%, or 0% (or any integer value between 0% and 50%) of glycosidic linkages that are not alpha-1,3.

The terms "glycosidic linkage" and "glycosidic bond" are used interchangeably herein and refer to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. This linkage is illustrated in the poly alpha-1,3-glucan structure provided above. Herein, "alpha-D-glucose" will be referred to as "glucose". All glycosidic linkages disclosed herein are alpha-glycosidic linkages, except where otherwise noted.

The "molecular weight" of poly alpha-1,3-glucan can be represented as number-average molecular weight ($M_n$) or as weight-average molecular weight ($M_w$). Alternatively, molecular weight can be represented as Daltons, grams/mole, DPw (weight average degree of polymerization), or DPn (number average degree of polymerization). Various means are known in the art for calculating these molecular weight measurements, such as high-pressure liquid chromatography (HPLC), size exclusion chromatography (SEC), or gel permeation chromatography (GPC).

The poly alpha-1,3-glucan may have a weight average degree of polymerisation (DPw) of at least about 400. In some embodiments, the poly alpha-1,3-glucan has a DPw of from about 400 to about 1400, or from about 400 to about 1000, or from about 500 to about 900.

In one embodiment, the polysaccharide comprises water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000.

In one embodiment, the polysaccharide is poly alpha-1,3-1,6-glucan. In one embodiment, the polysaccharide comprises poly alpha-1,3-1,6-glucan wherein (i) at least 30% of the glycosidic linkages of the poly alpha-1,3-1,6-glucan are alpha-1,3 linkages, (ii) at least 30% of the glycosidic linkages of the poly alpha-1,3-1,6-glucan are alpha-1,6 linkages, (iii) the poly alpha-1,3-1,6-glucan has a weight average degree of polymerization ($DP_w$) of at least 1000; and (iv) the alpha-1,3 linkages and alpha-1,6 linkages of the poly alpha-1,3-1,6-glucan do not consecutively alternate with each other. In another embodiment, at least 60% of the glycosidic linkages of the poly alpha-1,3-1,6-glucan are alpha-1,6 linkages. The term "alpha-1,6-glycosidic linkage" as used herein refers to the covalent bond that joins alpha-D-glucose molecules to each other through carbons 1 and 6 on adjacent alpha-D-glucose rings.

Poly alpha-1,3-1,6-glucan is a product of a glucosyltransferase enzyme, as disclosed in United States Patent Application Publication 2015/0232785 A1, the disclosure of which is incorporated by reference herein in its entirety.

The glycosidic linkage profile of a glucan or a substituted glucan can be determined using any method known in the art. For example, a linkage profile can be determined using methods that use nuclear magnetic resonance (NMR) spectroscopy (e.g., $^{13}C$ NMR or $^1H$ NMR). These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, Fla., 2005), which is incorporated herein by reference.

The terms "poly alpha-1,3-1,6-glucan", "alpha-1,3-1,6-glucan polymer", and "poly (alpha-1,3)(alpha-1,6) glucan" are used interchangeably herein (note that the order of the linkage denotations "1,3" and "1,6" in these terms is of no moment). Poly alpha-1,3-1,6-glucan herein is a polymer comprising glucose monomeric units linked together by glycosidic linkages (i.e., glucosidic linkages), wherein at least about 30% of the glycosidic linkages are alpha-1,3-glycosidic linkages, and at least about 30% of the glycosidic linkages are alpha-1,6-glycosidic linkages. Poly alpha-1,3-1,6-glucan is a type of polysaccharide containing a mixed glycosidic linkage content. The meaning of the term poly alpha-1,3-1,6-glucan in certain embodiments herein excludes "alternan," which is a glucan containing alpha-1,3 linkages and alpha-1,6 linkages that consecutively alternate with each other (U.S. Pat. No. 5,702,942, U.S. Pat. Appl. Publ. No. 2006/0127328). Alpha-1,3 and alpha-1,6 linkages that "consecutively alternate" with each other can be visually represented by . . . G-1,3-G-1,6-G-1,3-G-1,6-G-1,3-G-1,6-G-1,3-G- . . . , for example, where G represents glucose.

The "molecular weight" of a poly alpha-1,3-1,6-glucan herein can be represented as number-average molecular weight ($M_n$) or as weight-average molecular weight ($M_w$). Alternatively, molecular weight can be represented as Daltons, grams/mole, $DP_w$ (weight average degree of polymerization), or $DP_n$ (number average degree of polymerization). Various means are known in the art for calculating these molecular weight measurements such as with high-pressure liquid chromatography (HPLC), size exclusion chromatography (SEC), or gel permeation chromatography (GPC).

The term "poly alpha-1,3-1,6-glucan wet cake" herein refers to poly alpha-1,3-1,6-glucan that has been separated from a slurry and washed with water or an aqueous solution. Poly alpha-1,3-1,6-glucan is not completely dried when preparing a wet cake.

The term "aqueous solution" herein refers to a solution in which the solvent is water. Poly alpha-1,3-1,6-glucan can be dispersed, mixed, and/or dissolved in an aqueous solution.

In some embodiments:
(i) at least 30% of the glycosidic linkages of the poly alpha-1,3-1,6-glucan are alpha-1,3 linkages,
(ii) at least 30% of the glycosidic linkages of the poly alpha-1,3-1,6-glucan are alpha-1,6 linkages,
(iii) the poly alpha-1,3-1,6-glucan has a weight average degree of polymerization ($DP_w$) of at least 1000; and
(iv) the alpha-1,3 linkages and alpha-1,6 linkages of the poly alpha-1,3-1,6-glucan do not consecutively alternate with each other.

At least 30% of the glycosidic linkages of poly alpha-1,3-1,6-glucan are alpha-1,3 linkages, and at least 30% of the glycosidic linkages of the poly alpha-1,3-1,6-glucan are alpha-1,6 linkages. Alternatively, the percentage of alpha-1,3 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, or 64%. Alternatively still, the percentage of alpha-1,6 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, or 69%.

A poly alpha-1,3-1,6-glucan can have any one the aforementioned percentages of alpha-1,3 linkages and any one of the aforementioned percentages of alpha-1,6 linkages, just so long that the total of the percentages is not greater than 100%. For example, poly alpha-1,3-1,6-glucan herein can have (i) any one of 30%, 31%, 32%, 33%, 34%, 35%, 36%, 37%, 38%, 39%, or 40% (30%-40%) alpha-1,3 linkages and (ii) any one of 60%, 61%, 62%, 63%, 64%, 65%, 66%, 67%, 68%, or 69% (60%-69%) alpha-1,6 linkages, just so long that the total of the percentages is not greater than 100%. Non-limiting examples include poly alpha-1,3-1,6-glucan with 31% alpha-1,3 linkages and 67% alpha-1,6 linkages. In certain embodiments, at least 60% of the glycosidic linkages of the poly alpha-1,3-1,6-glucan are alpha-1,6 linkages.

A poly alpha-1,3-1,6-glucan can have, for example, less than 10%, 9%, 8%, 7%, 6%, 5%, 4%, 3%, 2%, or 1% of glycosidic linkages other than alpha-1,3 and alpha-1,6. In another embodiment, a poly alpha-1,3-1,6-glucan only has alpha-1,3 and alpha-1,6 linkages.

Other examples of alpha-1,3 and alpha-1,6 linkage profiles and methods for their product are disclosed in published United States patent application 2015/0232785.

The backbone of a poly alpha-1,3-1,6-glucan can be linear/unbranched. Alternatively, there can be branches in the poly alpha-1,3-1,6-glucan. A poly alpha-1,3-1,6-glucan in certain embodiments can thus have no branch points or less than about 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% branch points as a percent of the glycosidic linkages in the polymer.

The alpha-1,3 linkages and alpha-1,6 linkages of a poly alpha-1,3-1,6-glucan do not consecutively alternate with each other. For the following discussion, consider that . . . G-1,3-G-1,6-G-1,3-G-1,6-G-1,3-G-... (where G represents glucose) represents a stretch of six glucose monomeric units linked by consecutively alternating alpha-1,3 linkages and alpha-1,6 linkages. Poly alpha-1,3-1,6-glucan in certain embodiments herein comprises less than 2, 3, 4, 5, 6, 7, 8, 9, 10, or more glucose monomeric units that are linked consecutively with alternating alpha-1,3 and alpha-1,6 linkages.

The molecular weight of a poly alpha-1,3-1,6-glucan can be measured as $DP_w$ (weight average degree of polymerization) or $DP_n$ (number average degree of polymerization). Alternatively, molecular weight can be measured in Daltons or grams/mole. It may also be useful to refer to the number-average molecular weight ($M_n$) or weight-average molecular weight ($M_w$) of the poly alpha-1,3-1,6-glucan.

A poly alpha-1,3-1,6-glucan herein can have a $DP_w$ of at least about 1000. For example, the $DP_w$ of the poly alpha-1,3-1,6-glucan can be at least about 10000. Alternatively, the $DP_w$ can be at least about 1000 to about 15000. Alternatively still, the $DP_w$ can be at least about 1000, 2000, 3000, 4000, 5000, 6000, 7000, 8000, 9000, 10000, 11000, 12000, 13000, 14000, or 15000 (or any integer between 1000 and 15000), for example. Given that a poly alpha-1,3-1,6-glucan herein can have a $DP_w$ of at least about 1000, such a glucan polymer is typically water-insoluble.

A poly alpha-1,3-1,6-glucan herein can have an $M_w$ of at least about 50000, 100000, 200000, 300000, 400000, 500000, 600000, 700000, 800000, 900000, 1000000, 1100000, 1200000, 1300000, 1400000, 1500000, or 1600000 (or any integer between 50000 and 1600000), for example. The $M_w$ in certain embodiments is at least about 1000000. Alternatively, poly alpha-1,3-1,6-glucan can have an $M_w$ of at least about 4000, 5000, 10000, 20000, 30000, or 40000, for example.

A poly alpha-1,3-1,6-glucan herein can comprise at least 20 glucose monomeric units, for example. Alternatively, the number of glucose monomeric units can be at least 25, 50, 100, 500, 1000, 2000, 3000, 4000, 5000, 6000, 7000, 8000, or 9000 (or any integer between 10 and 9000), for example.

Poly alpha-1,3-1,6-glucan herein can be provided in the form of a powder when dry, or a paste, colloid or other dispersion when wet, for example.

In another embodiment, the polysaccharide comprises a composition comprising a poly alpha-1,3-glucan ester compound represented by Structure I:

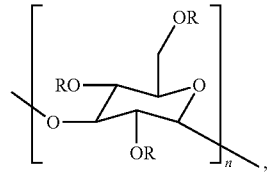

Structure I wherein
(i) n is at least 6;
(ii) each R is independently an —H or a first group comprising —CO—$C_x$—COOH, wherein the —$C_x$— portion of said first group comprises a chain of 2 to 6 carbon atoms; and
(iii) the compound has a degree of substitution with the first group of about 0.001 to about 3.

Such compositions and their preparation are disclosed in published patent application WO 2017/003808, the disclosure of which is incorporated herein by reference in its entirety. The terms "poly alpha-1,3-glucan ester compound", "poly alpha-1,3-glucan ester", "poly alpha-1,3-glucan ester derivative", "glucan ester" and the like are used interchangeably herein. A poly alpha-1,3-glucan ester compound of Structure I is termed an "ester" herein by virtue of comprising the substructure —$C_G$—O—CO—$C_x$—, where "—$C_G$—" represents carbon 2, 4, or 6 of a glucose monomeric unit of a poly alpha-1,3-glucan ester compound, and where "—CO—$C_x$—" is comprised in the first group. A poly alpha-1,3-glucan monoester contains one type of first group. A poly alpha-1,3-glucan mixed ester contains two or more types of a first group.

A poly alpha-1,3-glucan ester compound useful in preparing a masterbatch composition as disclosed herein has a degree of substitution (DoS) with one or more first groups of about 0.001 to about 3. Alternatively, the DoS of a poly alpha-1,3-glucan ester compound can be about 0.001 to about 0.02, 0.025, 0.03, 0.035, 0.04, 0.05, 0.06, 0.07, 0.08, 0.09, or 0.1, for example. The DoS can optionally be expressed as a range between any two of these values. It would be understood by those skilled in the art that, since a poly alpha-1,3-glucan ester compound herein has a degree of substitution between about 0.001 to about 0.1, the R groups of the compound cannot only be hydrogen. The term "degree of substitution" (DoS) as used herein refers to the average number of hydroxyl groups substituted in each monomeric unit (glucose) of a poly alpha-1,3-glucan ester compound. The structure, molecular weight and DoS of a poly alpha-1,3-glucan ester product can be confirmed using various physiochemical analyses known in the art such as NMR spectroscopy and size exclusion chromatography (SEC).

In general, each carbon in the chain of the —$C_x$— portion of the first group, aside from being covalently bonded with an adjacent carbon atom(s) in the chain or a carbon atom of the flanking C=O and COOH groups, can also be bonded to hydrogen(s), a substituent group(s) such as an organic group, and/or be involved in a carbon-carbon double-bond. For example, a carbon atom in the —$C_x$— chain can be saturated (i.e., —$CH_2$—), double-bonded with an adjacent carbon atom in the —$C_x$— chain (e.g., —CH=CH—), and/or be bonded to a hydrogen and an organic group (i.e., one hydrogen is substituted with an organic group). Skilled artisans would understand how the carbon atoms of the —$C_x$— portion of a first group comprising —CO—$C_x$—COOH can typically be bonded, given that carbon has a valency of four.

As disclosed in published patent application WO 2017/003808, poly alpha-1,3-glucan esters represented by Structure I can be prepared by esterification of one or more hydroxyl groups of the glucose units of the glucan with a first group provided by a cyclic organic anhydride having a formula represented by Structure III shown below:

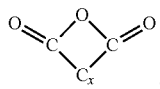

Structure III

The —$C_x$— portion of Structure III typically comprises a chain of 2 to 6 carbon atoms; each carbon atom in this chain preferably has four covalent bonds. It is contemplated that, in some embodiments, the —$C_x$— portion can comprise a chain of 2 to 16, 2 to 17, or 2 to 18 carbon atoms. During an esterification reaction herein, the anhydride group (—CO—O—CO—) of a cyclic organic anhydride breaks such that one end of the broken anhydride becomes a —COOH group and the other end is esterified to a hydroxyl group of poly alpha-1,3-glucan, thereby rendering an esterified first group (—CO—$C_x$—COOH). Depending on the cyclic organic anhydride used, there typically can be one or two possible products of such an esterification reaction.

In certain embodiments, the —$C_x$— portion of the first group (—CO—$C_x$—COOH) comprises only $CH_2$ groups. Examples of a first group in which the —$C_x$— portion comprises only $CH_2$ groups are —CO—$CH_2$—$CH_2$—COOH, —CO—$CH_2$—$CH_2$—$CH_2$—COOH, —CO—$CH_2$—$CH_2$—$CH_2$—$CH_2$—COOH, —CO—$CH_2$—$CH_2$—$CH_2$—$CH_2$—COOH, and —CO—$CH_2$—$CH_2$—$CH_2$—$CH_2$—$CH_2$—$CH_2$—COOH. The first groups can be derived, respectively, by reacting succinic anhydride, glutaric anhydride, adipic anhydride, pimelic anhydride, or suberic anhydride with poly alpha-1,3-glucan.

The —$C_x$— portion of the first group (—CO—$C_x$—COOH) in some aspects can comprise (i) at least one double-bond in the carbon atom chain, and/or (ii) at least one branch comprising an organic group. For instance, the —$C_x$— portion of the first group can have at least one double-bond in the carbon atom chain. Examples of a first group in which the —$C_x$— portion comprises a carbon-carbon double-bond include —CO—CH=CH—COOH, —CO—CH=CH—$CH_2$—COOH, —CO—CH=CH—$CH_2$—$CH_2$—COOH, —CO—CH=CH—$CH_2$—$CH_2$—$CH_2$—COOH, —CO—$CH_2$—CH=CH—COOH, —CO—$CH_2$—CH=CH—$CH_2$—COOH, —CO—$CH_2$—$CH_2$—CH=CH—COOH, —CO—$CH_2$—CH=CH—$CH_2$—$CH_2$—COOH, —CO—$CH_2$—CH=CH—$CH_2$—COOH, —CO—$CH_2$—$CH_2$—$CH_2$—COOH, —CO—$CH_2$—CH=CH—$CH_2$—$CH_2$—COOH, —CO—$CH_2$—$CH_2$—$CH_2$—$CH_2$—COOH, —CO—$CH_2$—$CH_2$—CH=CH—COOH, —CO—$CH_2$—CH=CH—$CH_2$—COOH, —CO—$CH_2$—$CH_2$—COOH, —CO—$CH_2$—$CH_2$—$CH_2$—COOH, —CO—$CH_2$—$CH_2$—CH=CH—COOH. Each of these first groups can be derived by reacting the appropriate cyclic organic anhydride with poly alpha-1,3-glucan. For example, to produce a first group comprising —CO—CH=CH—COOH, maleic anhydride can be reacted with poly alpha-1,3-glucan. Thus, a cyclic organic anhydride comprising a —$C_x$— portion represented in any of the above-listed first groups (where the corresponding —$C_x$— portion of a cyclic organic anhydride is that portion linking each side of the anhydride group [—CO—O—CO—] together to form a cycle) can be reacted with poly alpha-1,3-glucan to produce an ester thereof having the corresponding first group (—CO—$C_x$—COOH).

The —$C_x$— portion of the first group (—CO—$C_x$—COOH) in some aspects herein can comprise at least one branch comprising an organic group. Examples of a first group in which the —$C_x$— portion comprises at least one organic group branch include:

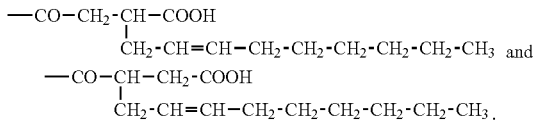

Each of these two first groups can be derived by reacting 2-nonen-1-yl succinic anhydride with poly alpha-1,3-glucan. It can be seen that the organic group branch (generically termed "$R^b$" herein) in both these examples is —$CH_2$—CH=CH—$CH_2$—$CH_2$—$CH_2$—$CH_2$—$CH_2$—$CH_3$. It can also be seen that the $R^b$ group substitutes for a hydrogen in the —$C_x$— carbon chain.

Thus, for example, a first group (—CO—$C_x$—COOH) herein can be any of —CO—$CH_2$—$CH_2$—COOH, —CO—$CH_2$—$CH_2$—$CH_2$—COOH, —CO—$CH_2$—$CH_2$—$CH_2$—$CH_2$—COOH, —CO—$CH_2$—$CH_2$—$CH_2$—$CH_2$—$CH_2$—COOH, or —CO—$CH_2$—$CH_2$—$CH_2$—$CH_2$—$CH_2$—$CH_2$—COOH, but in which at least one, two, three, or more hydrogens thereof is/are substituted with an $R^b$ group. Also for example, a first group (—CO—$C_x$—COOH) herein can be any of —CO—CH=CH—$CH_2$—COOH, —CO—CH=CH—$CH_2$—$CH_2$—COOH, —CO—CH=CH—$CH_2$—$CH_2$—$CH_2$—COOH, —CO—CH=CH—$CH_2$—$CH_2$—$CH_2$—COOH, —CO—$CH_2$—CH=CH—COOH, —CO—$CH_2$—$CH_2$—CH=CH—COOH, —CO—$CH_2$—CH=CH—$CH_2$—$CH_2$—COOH, —CO—$CH_2$—CH=CH—$CH_2$—$CH_2$—$CH_2$—COOH, —CO—$CH_2$—$CH_2$—$CH_2$—CH=CH—COOH, —CO—$CH_2$—CH=CH—$CH_2$—COOH, —CO—$CH_2$—$CH_2$—CH=CH—$CH_2$—COOH, —CO—$CH_2$—CH=CH—$CH_2$—$CH_2$—COOH, —CO—$CH_2$—$CH_2$—$CH_2$—CH=CH—COOH, or —CO—$CH_2$—$CH_2$—$CH_2$—$CH_2$—CH=CH—COOH, but in which at least one, two, three, or more hydrogens thereof is/are substituted with an $R^b$ group (such first groups are examples in which the —$C_x$— portion comprises at least one double-bond in the carbon atom chain and at least one branch comprising an organic group). Suitable examples of $R^b$ groups herein include alkyl groups and alkenyl groups. An alkyl group herein can comprise 1-18 carbons (linear or branched), for example (e.g., methyl, ethyl, propyl, butyl, pentyl, hexyl, heptyl, octyl, nonyl, or decyl group). An alkenyl group herein can comprise 1-18 carbons (linear or branched), for example (e.g., methylene, ethenyl, propenyl, butenyl, pentenyl, hexenyl, heptenyl, octenyl [e.g., 2-octenyl], nonenyl [e.g., 2-nonenyl], or decenyl group). One of skill in the art would understand, based on the formula of the cyclic organic anhydride represented by Structure III and its involvement in the esterification process to prepare poly alpha-1,3-glucan esters of Structure I herein as disclosed in WO 2017/003808, what particular cyclic organic anhydride is suitable for deriving any of these first groups.

Examples of cyclic organic anhydrides by name that can be included in a reaction with poly alpha-1,3-glucan to form a poly alpha-1,3-glucan ester compound represented by Structure I include maleic anhydride, methylsuccinic anhydride, methylmaleic anhydride, dimethylmaleic anhydride, 2-ethyl-3-methylmaleic anhydride, 2-hexyl-3-methylmaleic anhydride, 2-ethyl-3-methyl-2-pentenedioic anhydride, itaconic anhydride (2-methylenesuccinic anhydride), 2-nonen-1-ylsuccinic anhydride, and 2-octen-1-ylsuccinic anhydride. Alkenyl succinic anhydrides and alkylketene dimers, for example those derived from palmitic acid or other long chain carboxylic acids, can also be used. In particular, for example, maleic anhydride can be used to esterify —CO—CH=CH—COOH as a first group to poly alpha-1,3-glucan; methylsuccinic anhydride can be used to esterify —CO—CH$_2$—CH(CH$_3$)—COOH and/or —CO—CH(CH$_3$)—CH$_2$—COOH as a first group to poly alpha-1,3-glucan; methylmaleic anhydride can be used to esterify —CO—CH=C(CH$_3$)—COOH and/or —CO—C(CH$_3$)=CH—COOH as a first group to poly alpha-1,3-glucan; dimethylmaleic anhydride can be used to esterify —CO—C(CH$_3$)=C(CH$_3$)—COOH as a first group to poly alpha-1,3-glucan; 2-ethyl-3-methylmaleic anhydride can be used to esterify —CO—C(CH$_2$CH$_3$)=C(CH$_3$)—COOH and/or —CO—C(CH$_3$)=C(CH$_2$CH$_3$)—COOH as a first group to poly alpha-1,3-glucan; 2-hexyl-3-methylmaleic anhydride can be used to esterify —CO—C(CH$_2$CH$_2$CH$_2$CH$_2$CH$_2$CH$_3$)=C(CH$_3$)—COOH and/or —CO—C(CH$_3$)=C(CH$_2$CH$_2$CH$_2$CH$_2$CH$_2$CH$_3$)—COOH as a first group to poly alpha-1,3-glucan; itaconic anhydride can be used to esterify —CO—CH$_2$—C(CH$_2$)—COOH and/or —CO—C(CH$_2$)—CH$_2$—COOH as a first group to poly alpha-1,3-glucan; 2-nonen-1-ylsuccinic anhydride can be used to esterify —CO—CH$_2$—CH(CH$_2$CH=CHCH$_2$CH$_2$CH$_2$CH$_2$CH$_3$)—COOH and/or —CO—CH(CH$_2$CH=CHCH$_2$CH$_2$CH$_2$CH$_2$CH$_3$)—CH$_2$—COOH as a first group to poly alpha-1,3-glucan.

As disclosed in WO 2017/003808, each of these first groups comprising a —C$_x$— portion with at least one organic group branch can be derived by reacting the appropriate cyclic organic anhydride with poly alpha-1,3-glucan. An example of using 2-nonen-1-yl succinic anhydride is described above. Another illustrative example includes using methylsuccinic anhydride to ester-derivatize poly alpha-1,3-glucan, where the resultant first group is —CO—CH$_2$—CH(CH$_3$)—COOH or —CO—CH(CH$_3$)—CH$_2$—COOH. Still another illustrative example includes using methylmaleic anhydride to ester-derivatize poly alpha-1,3-glucan, where the resultant first group is —CO—CH=C(CH$_3$)—COOH or —CO—C(CH$_3$)=CH—COOH. Still another illustrative example includes using itaconic anhydride (2-methylenesuccinic anhydride) to ester-derivatize poly alpha-1,3-glucan, where the resultant first group is —CO—CH$_2$—C(CH$_2$)—COOH or —CO—C(CH$_2$)—CH$_2$—COOH. Thus, a cyclic organic anhydride comprising a —C$_x$— portion represented in any of the above-listed first groups (where the corresponding —C$_x$— portion of a cyclic organic anhydride is that portion linking each side of the anhydride group [—CO—O—CO—] together to form a cycle) can be reacted with poly alpha-1,3-glucan to produce an ester thereof having the corresponding first group (—CO—C$_x$—COOH).

Poly alpha-1,3-glucan ester compounds in certain embodiments can contain one type of a first group comprising —CO—C$_x$—COOH. For example, one or more R groups ester-linked to the glucose group in the above formula may be —CO—CH$_2$—CH$_2$—COOH; the R groups in this particular example would thus independently be hydrogen and —CO—CH$_2$—CH$_2$—COOH groups (such an ester compound can be referred to as poly alpha-1,3-glucan succinate). As another example, one or more R groups ester-linked to the glucose group in the above formula may be —CO—CH=CH—COOH; the R groups in this particular example would thus independently be hydrogen and —CO—CH=CH—COOH groups (such an ester compound can be referred to as poly alpha-1,3-glucan maleate).

Those skilled in the art would understand that in certain embodiments herein, a poly alpha-1,3-glucan ester compound can be in an anionic form under aqueous conditions. This anionic behavior is due to the presence of a carboxyl group (COOH) in the esterified first group (—CO—C$_x$—COOH). Carboxyl (COOH) groups of a poly alpha-1,3-glucan ester compound herein can convert to carboxylate (COO$^-$) groups in aqueous conditions. These anionic groups can interact with salt cations such as potassium, sodium, or lithium cations, if present.

In one embodiment, a poly alpha-1,3-glucan ester compound represented by Structure I as disclosed herein comprises poly alpha-1,3-glucan succinate, poly alpha-1,3-glucan methylsuccinate, poly alpha-1,3-glucan 2-methylene succinate, poly alpha-1,3-glucan maleate, poly alpha-1,3-glucan methylmaleate, poly alpha-1,3-glucan dimethyl maleate, poly alpha-1,3-glucan 2-ethyl-3-methyl maleate, poly alpha-1,3-glucan 2-hexyl-3-methyl maleate, poly alpha-1,3-glucan 2-ethyl-3-methylglutaconate, poly alpha-1,3-glucan 2-nonen-1-yl-succinate, poly alpha-1,3-glucan 2-octene-1-yl succinate, or mixtures thereof. In another embodiment, the poly alpha-1,3-glucan ester compound represented by Structure I comprises poly alpha-1,3-glucan succinate.

A poly alpha-1,3-glucan ester compound herein can have at least about 50%, 60%, 70%, 80%, 90%, 95%, 96%, 97%, 98%, 99%, or 100% (or any integer between 50% and 100%) glycosidic linkages that are alpha-1,3. In such embodiments, accordingly, the poly alpha-1,3-glucan ester compound has less than about 50%, 40%, 30%, 20%, 10%, 5%, 4%, 3%, 2%, 1%, or 0% (or any integer value between 0% and 50%) of glycosidic linkages that are not alpha-1,3. A poly alpha-1,3-glucan ester compound preferably has at least about 98%, 99%, or 100% glycosidic linkages that are alpha-1,3.

The backbone of a poly alpha-1,3-glucan ester compound herein is preferably linear/unbranched. In certain embodiments, the compound has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points.

The formula of a poly alpha-1,3-glucan ester compound in certain embodiments can have an n value of at least 6. Alternatively, n can have a value of at least 10, 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 (or any integer between 10 and 4000), for example. The value of n in still other examples can be in a range of 25-250, 50-250, 75-250, 100-250, 150-250, 200-250, 25-200, 50-200, 75-200, 100-200, 150-200, 25-150, 50-150, 75-150, 100-150, 25-100, 50-100, 75-100, 25-75, 50-75, or 25-50.

The molecular weight of a poly alpha-1,3-glucan ester compound disclosed herein can be measured as number-average molecular weight ($M_n$) or as weight-average molecular weight ($M_w$). Alternatively, molecular weight can be measured in Daltons or grams/mole. It may also be useful to refer to the $DP_w$ (weight average degree of polymerization) or $DP_n$ (number average degree of polymerization) of the poly alpha-1,3-glucan polymer component of the compound. The $M_n$ or $M_w$ of a poly alpha-1,3-glucan ester compound herein can be at least about 1000, for example. Alternatively, the $M_n$ or $M_w$ can be at least about 1000 to about 600000. Alternatively still, the $M_n$ or $M_w$ can be at least about 10000, 25000, 50000, 75000, 100000, 125000, 150000, 175000, 200000, 225000, 250000, 275000, or 300000 (or any integer between 10000 and 300000), for example.

The aqueous polysaccharide dispersion or basic aqueous polysaccharide solution is mixed with a rubber latex solution containing a rubber component to form a mixture. In one embodiment, the rubber latex solution contains a rubber component comprising at least one diene-based sulfur-vulcanizable or peroxide-vulcanizable elastomer having a Tg below −30° C., as determined by dynamic mechanical analysis. In another embodiment, the rubber component of the rubber latex solution can be any suitable elastomer or combination of elastomers such as, for example, natural rubber, synthetic polyisoprene, polybutadiene rubber, styrene/butadiene rubber (prepared by aqueous emulsion or organic solvent polymerization), ethylene propylene diene monomer rubber, hydrogenated nitrile butadiene rubber, neoprene, styrene/isoprene/butadiene terpolymer rubber, butadiene/acrylonitrile rubber, polyisoprene rubber, isoprene/butadiene rubber, nitrile rubber, ethylene-acrylic rubber, butyl and halobutyl rubber, chlorosulfonated polyethylene, fluoroelastomer, hydrocarbon rubber, polybutadiene, silicone rubber, and combinations thereof. As used herein, the term "neoprene" is synonymous with polychloroprene and refers to synthetic rubber produced ty the polymerization of chloroprene, including sulfur-modified chloroprene. In one embodiment, the rubber component of the rubber latex solution comprises natural rubber, synthetic polyisoprene, styrene butadiene rubber, ethylene propylene diene monomer rubber, hydrogenated nitrile rubber, polybutadiene, or neoprene. In one embodiment, the rubber component of the rubber latex solution comprises natural rubber. In one embodiment, the rubber component of the rubber latex solution comprises styrene butadiene rubber. In one embodiment, the rubber component of the rubber latex solution comprises ethylene propylene diene monomer rubber. In one embodiment, the rubber component of the rubber latex solution comprises hydrogenated nitrile butadiene rubber. In one embodiment, the rubber component of the rubber latex solution comprises neoprene. In one embodiment, the rubber component of the rubber latex solution comprises silicone rubber. Rubber latex solutions of such materials can be obtained commercially or prepared by methods known in the art.

The rubber particles of the rubber latex solution can have an average particle size in the range from about 10 to 1000 nm. In one embodiment, the polymer average particle size in the latex solution is in the range of about 40 nm to about 700 nm. In another embodiment, the polymer average particle size range is from about 80 nm to about 400 nm.

In the mixing step, the polysaccharide can be combined with the rubber component of the rubber latex solution in any useful amount, for example in an amount from about 1 to about 800 parts per hundred of polysaccharide per rubber component. As used herein, the rubber component is defined to be 100 parts per hundred (phr) of the masterbatch composition produced using the method disclosed herein, and the amount of polysaccharide is conveniently cited as parts per hundred (phr), based on the weight fraction of the rubber component, as is typically done in the art when reciting the ingredients of a rubber composition. In one embodiment, the masterbatch composition comprises from about 5 to about 800 parts per hundred of polysaccharide, based on the weight fraction of the total rubber solid component. In another embodiment, the masterbatch composition comprises at least 10 parts per hundred (phr) of the polysaccharide. In yet another embodiment, the masterbatch composition comprises an amount of polysaccharide that is 5, 10, 15, 20, 25, 30, 35, 40, 45, 50, 55, 60, 65, 70, 75, 80, 85, 90, 95, or 100 (or any value between 5 and 100) parts per hundred, based on the weight fraction of the rubber component.

The aqueous polysaccharide dispersion or basic aqueous polysaccharide solution can be mixed with a rubber latex solution by methods known in the art. In one embodiment, the aqueous polysaccharide dispersion, or basic aqueous polysaccharide solution, can be charged into a mixer, for example a homo-mixer, and the rubber latex solution is then added slowly to the polysaccharide dispersion or polysaccharide solution with sufficient mixing to provide good dispersion of the rubber latex solution in the polysaccharide dispersion or solution. In another embodiment, the rubber latex solution can be charged into a mixer and the polysaccharide dispersion or solution can be added slowly while the rubber latex solution is mixed well. In an additional embodiment, the polysaccharide dispersion or polysaccharide solution and the rubber latex solution are each allowed to flow at predetermined rates, and the polysaccharide flow and the rubber latex flow are mixed together by severe hydraulic agitation. The mixing provides an intimate interaction between the polysaccharide and the elastomeric chains of the rubber component.

In another embodiment, the rubber masterbatch composition can further comprise at least one coupling agent. Useful coupling agents includes silanes, alkenyl succinic anhydride, alkylketene dimer, polyetheramines, maleic anhydride, and isocyanates. The coupling agents may be incorporated in the masterbatch during the mixing step, the coagulation step, or post-coagulation in the formulation compounding process. Useful polyetheramine coupling agents include monoamines, diamines, and triamines having polyether backbones with molecular weights in the range of from about 200 g/mole to about 5000 g/mole, or higher. Maleic anhydride may be added during the compounding process with or without the use of a peroxide initiator such as dicumyl peroxide. Isocyanates useful as coupling agents, and which may usually be added after drying of the masterbatch composition, include methylene diphenyl diisocyanate, toluene diisocyanates, hexamethylene diisocyanate (HDI), and isophorone diisocyanate. In one embodiment, the rubber masterbatch composition comprises at least one coupling agent in an amount of from 0 to 25 phr. In another embodiment, the rubber composition comprises 1 phr, 2 phr, 3 phr, 4 phr, 5 phr, 6 phr, 7 phr, 8 phr, 9 phr, 10 phr, 11 phr, 12 phr, 13 phr, 14 phr, 15 phr, 16 phr, 17 phr, 18 phr, 19 phr, 20 phr, 21, 22, 23, 24 or 25 phr of at least one coupling agent. In one embodiment of the method, step a) mixing further comprises adding at least one coupling agent, and the coupling agent comprises a silane, alkenyl succinic anhydride, alkylketene dimer, polyetheramine, maleic anhydride, methylene diphenyl diisocyanate, or a mixture thereof.

In one embodiment, the mixing step further comprises adding a filler. The filler can be used in solid form or as an aqueous dispersion. In one embodiment, the filler may be a reinforcing filler. The filler can be mixed first with the rubber latex solution, and then mixed with the aqueous polysaccharide dispersion or basic aqueous polysaccharide solution. Alternatively, the filler can be mixed first with the polysaccharide dispersion or the polysaccharide solution, and then mixed with the rubber latex solution. In another embodiment, a flow comprising the filler can be mixed together with a flow comprising the polysaccharide dispersion or polysaccharide solution and a flow comprising the rubber latex solution, and the three flows can be mixed together by severe hydraulic agitation.

In one embodiment, the filler comprises silica, carbon black, graphene, fullerene, carbon nanotubes, or mixtures thereof. Titanium dioxide, aluminum silicate, clay, talc, or a combination thereof can also be useful as fillers. In one embodiment, the filler comprises silica. In another embodiment, the filler comprises carbon black. In an additional embodiment, the filler comprises graphene. In yet an additional embodiment, the filler comprises fullerene. In a further embodiment, the filler comprises carbon nanotubes. In one embodiment of the method, step a) mixing further comprises adding a filler, wherein the filler comprises silica, carbon black, graphene, fullerene, carbon nanotubes, or a mixture thereof. The choice of filler and amount used in the masterbatch composition can vary depending on the final elastomeric composition prepared from the masterbatch composition, and on the end use application.

The silica can be any suitable silica such as, for example, synthetic, precipitated silicas and fumed silica. Representative of such silicas are silicas from PPG Industries under the Hi-Sil trademark; silicas from Rhodia under the Zeosil trademark; silicas from Degussa AG with designations VN2 and VN3, and silicas from AKZO Chemie. In one embodiment, the masterbatch composition comprises silica in an amount of from 0 to 100 phr (parts by weight per 100 parts by weight of the rubber component). In another embodiment, the rubber composition comprises silica in an amount of 1, 2, 3, 4, 5, 6, 7, 8, 9, 10, 11, 12, 13, 14, 15, 16, 17, 18, 19, or 20 phr.

Silica may be used as the only filler in the masterbatch composition or, optionally, one or more other fillers may be used in combination with silica. In one embodiment, carbon black and silica are used as fillers in the masterbatch composition. In another embodiment, the masterbatch composition comprises carbon black in an amount of from 0 to 100 phr. In another embodiment, the masterbatch composition comprises 1 phr, 2 phr, 3 phr, 4 phr, 5 phr, 10 phr, 15 phr, 20 phr, 25 phr, 30 phr, 35 phr, 40 phr, 45 phr, 50 phr, 55 phr, 60 phr, 65 phr, 70 phr, 75 phr, 80 phr, 85 phr, 90 phr, 95 phr, or 100 phr of carbon black. In an additional embodiment, the masterbatch composition comprises a total amount of silica and carbon black in the range of 50 phr to 150 phr, for example from 50 phr to 75 phr, or from 50 phr to 100 phr, or from 50 phr to 125 phr, or from 75 phr to 100 phr, or from 75 phr to 125 phr, or from 75 phr to 150 phr, or from 125 phr to 150 phr.

In another embodiment, graphene, fullerene, and carbon nanotubes can be used separately or in combination as filler in the masterbatch composition. Graphene refers to an allotrope of carbon in the form of a two-dimensional, atomic scale, hexagonal lattice in which one atom forms each vertex. As used herein, "fullerene" means a molecule of carbon in the form of a hollow sphere, ellipsoid, tube, or other shape. Cylindrical fullerenes are also known as carbon nanotubes. Carbon nanotubes can comprise single wall nanotubes, multiwall nanotubes, or mixtures thereof. As used herein, a single wall carbon nanotube refers to a hollow carbon fiber having a wall consisting essentially of a single layer of carbon atoms. Single wall carbon nanotubes can be made by the processes disclosed in Iijima et al., Nature, vol 363, p. 603 (1993); D. S. Bethune et al., Chem. Phys. Letters, vol 243 (1995) 49-54 and Science vol. 273 (1996) 483-487. As used herein, a multiwall nanotube refers to multiple concentric sheets of hollow carbon fibers. Typically, multiwall nanotubes are formed as byproduct of single wall carbon nanotube syntheses. In one embodiment, the masterbatch composition comprises graphene, fullerene, and/or carbon nanotubes in an amount of from 0 to 20 phr (parts by weight per 100 parts by weight of the rubber component). The graphene, fullerene, and carbon nanotubes can be obtained commercially.

After the step a) of mixing an aqueous polysaccharide dispersion, or a basic aqueous polysaccharide solution, with a rubber latex solution containing a rubber component to form a mixture, the method further comprises the step of b) coagulating the mixture obtained in step a) to produce a coagulated mass. Coagulating the mixture is effected by adding an inorganic salt and/or dilute acid to the mixture of polysaccharide and rubber latex solution. The coagulating step is generally done while providing mixing or agitation which is less vigorous than that in step a) mixing the polysaccharide and rubber latex components together. As the addition of the inorganic salt and/or dilute acid proceeds, the pH of the mixture drops and a coagulated blub of solid(s) (also referred to herein as a coagulated mass) is formed, together with an aqueous supernatant solution. In one embodiment, the pH of the aqueous supernatant solution can be between about 5 and about 6, for example about 5.5. The aqueous supernatant solution can be clear or hazy.

In one embodiment, step b) coagulating the mixture obtained in step a) to produce a coagulated mass comprises adding an inorganic salt to the mixture of step a). The inorganic salt can comprise, for example, LiCl, NaCl, KCl, $CaCl_2$, $MgCl_2$, $Al_2(SO_4)_3$, a zinc salt such as ZnCl or $ZnCl_2$, sodium sulfate, potassium sulfate, trisodium phosphate, tripotassium phosphate, potassium pyrophosphate, or sodium borate. Mixtures of these salts can also be used. In one embodiment, the inorganic salt comprises $CaCl_2$. In one embodiment, the inorganic salt comprises $MgCl_2$. In one embodiment, the inorganic salt comprises LiCl. In one embodiment, the inorganic salt comprises NaCl. In one embodiment, the inorganic salt comprises KCl. The inorganic salt can be added as a solid to the mixture obtained in step a), or the inorganic salt can be added as an aqueous solution or an aqueous dispersion. An aqueous solution can contain from about 5 weight percent to about 25 weight percent of the inorganic salt, based on the total weight of the solution. In one embodiment, the amount of inorganic salt added to the mixture obtained in step a) is in the range of from about 0.2 wt % to about 20 wt %, based on the total solids of the polysaccharide and rubber latex mixture. For example, the amount of inorganic salt added can be in the range of 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 wt %, based on the total solids of the polysaccharide and rubber latex mixture. The inorganic salt can be added slowly to the mixture obtained in step a) or the inorganic salt can be added in one portion or in several portions. Coagulating the mixture is typically performed while agitating the mixture. In one embodiment of the method, step b) coagulating the mixture further comprises adding an inorganic salt to the mixture, wherein the inorganic salt comprises LiCl, NaCl, KCl, CaCl$_2$, MgCl$_2$, Al$_2$(SO$_4$)$_3$, a zinc salt, sodium sulfate, potassium sulfate, trisodium phosphate, tripotassium phosphate, potassium pyrophosphate, sodium borate, or a combination thereof.

In another embodiment, step b) coagulating the mixture obtained in step a) to produce a coagulated mass comprises adding an acid to the mixture of step a). The acid can comprise, for example, acetic acid, sulfuric acid, nitric acid, boric acid, formic acid, an organic acid, or combinations thereof. In one embodiment, the acid comprises acetic acid. In one embodiment, the acid comprises sulfuric acid. In one embodiment, the acid comprises nitric acid. In one embodiment, the acid comprises boric acid. In one embodiment, the acid comprises formic acid. In one embodiment, the acid comprises an organic acid. Typically, the acid is used as an aqueous solution, for example at a concentration in the range of from about 2 weight percent to about 10 weight percent, for example 2, 3, 4, 5, 6, 7, 8, 9, or 10 weight percent based on the total weight of the acid solution. The acid can be added slowly to the mixture obtained in step a) or the acid can be added in one portion or in several portions. In one embodiment, the amount of acid added to the mixture obtained in step b) is in the range of from about 0.2 wt % to about 30 wt %, based on the total solids of the polysaccharide and rubber latex mixture. For example, the amount of acid added to the mixture can be 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %, based on the total solids of the polysaccharide and rubber latex mixture. Coagulating the mixture is typically performed with agitation. In one embodiment of the method, step b) coagulating the mixture further comprises adding an acid to the mixture, wherein the acid comprises acetic acid, sulfuric acid, nitric acid, boric acid, formic acid, an organic acid, or combinations thereof.

In an additional embodiment, step b) coagulating the mixture obtained in step a) to produce a coagulated mass comprises adding an inorganic salt and an acid to the mixture of step a). In one embodiment, calcium chloride and acetic acid are added to coagulate the mixture obtained in step a). In another embodiment, magnesium chloride and acetic acid are added to coagulate the mixture. In an additional embodiment, sodium chloride and acetic acid are added to coagulate the mixture. In a further embodiment, potassium chloride and acetic acid are added to coagulate the mixture.

The coagulated mass can be separated from the aqueous supernatant solution by filtration, decantation, or any other means known in the art and optionally washed, for example with water, before drying. The washing step removes residual aqueous supernatant solution and the inorganic salt and/or acid contained in the supernatant solution. In one embodiment, the step of drying the coagulated mass is performed while applying mechanical pressure to the coagulated mass. In one embodiment the coagulated mass can be pressed in a filter press, to aid in the release of encapsulated supernatant solution. In one embodiment, the step of drying the coagulated mass is performed by applying a stream of air or inert gas to the coagulated mass. In another embodiment, the step of drying the coagulated mass is performed under vacuum. In one embodiment, the step of drying the coagulated mass is performed at ambient temperature. In another embodiment, the step of drying the coagulated mass is performed by heating the coagulated mass to a temperature above ambient temperature for a selected period of time, for example 48 hours at 50-60° C. In a further embodiment, the coagulated mass can be cut or otherwise treated to produce smaller-sized pieces of coagulated mass, which may be useful to break open portions of the coagulated mass which have encapsulated portions of supernatant solution.

The polysaccharide-elastomer masterbatch compositions produced according to the methods disclosed herein can comprise from about 20 weight percent to about 80 weight percent polysaccharide, based on the weight of polysaccharide and rubber component in the masterbatch composition. For example, the amount of polysaccharide in the masterbatch composition can be in the range of 20, 25, 30, 35, 40, 45, 50, 55, 60, 65, 70, 75, or 80 weight percent, based on the weight of polysaccharide and rubber component in the masterbatch composition. Optionally, the masterbatch composition further comprises a filler. In some embodiments, a masterbatch composition produced by a method disclosed herein comprises at least one coupling agent. In one embodiment, a masterbatch composition produced by a method disclosed herein comprises a rubber component comprising an elastomer comprising natural rubber, synthetic polyisoprene, styrene butadiene rubber, ethylene propylene diene monomer rubber, hydrogenated nitrile butadiene rubber, polybutadiene, or neoprene.

In one embodiment, the masterbatch composition comprises
  i) poly alpha-1,3-glucan;
  ii) poly alpha-1,3-1,6-glucan;
  iii) water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000; or
  iv) a poly alpha-1,3-glucan ester compound represented by Structure I:

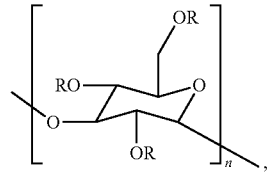

Structure I wherein
  (A) n is at least 6;
  (B) each R is independently an —H or a first group comprising —CO—C$_x$—COOH, wherein the —C$_x$— portion of said first group comprises a chain of 2 to 6 carbon atoms; and
  (C) the compound has a degree of substitution with the first group of about 0.001 to about 3; and
the rubber component comprises an elastomer comprising natural rubber, synthetic polyisoprene, styrene butadiene rubber, ethylene propylene diene monomer rubber, hydrogenated nitrile butadiene rubber, polybutadiene, or neoprene.

In one embodiment, a polysaccharide-elastomer masterbatch composition produced according to the methods disclosed herein comprises natural rubber and poly alpha-1,3-glucan. In another embodiment, the masterbatch composition comprises natural rubber and poly alpha-1,3-1,6-glucan. In yet another embodiment, the masterbatch composition comprises natural rubber and a poly alpha-1,3-glucan ester compound as disclosed herein.

In one embodiment, a polysaccharide-elastomer masterbatch composition produced according to the methods disclosed herein comprises styrene butadiene rubber and poly alpha-1,3-glucan. In another embodiment, the masterbatch composition comprises styrene butadiene rubber and poly alpha-1,3-1,6-glucan. In yet another embodiment, the masterbatch composition comprises styrene butadiene rubber and a poly alpha-1,3-glucan ester compound as disclosed herein.

In one embodiment, a polysaccharide-elastomer masterbatch composition produced according to the methods disclosed herein comprises synthetic polyisoprene and poly alpha-1,3-glucan. In another embodiment, the masterbatch composition comprises synthetic polyisoprene and poly alpha-1,3-1,6-glucan. In yet another embodiment, the masterbatch composition comprises synthetic polyisoprene and a poly alpha-1,3-glucan ester compound as disclosed herein.

In one embodiment, a polysaccharide-elastomer masterbatch composition produced according to the methods disclosed herein comprises ethylene propylene diene monomer rubber and poly alpha-1,3-glucan. In another embodiment, the masterbatch composition comprises ethylene propylene diene monomer rubber and poly alpha-1,3-1,6-glucan. In yet another embodiment, the masterbatch composition comprises ethylene propylene diene monomer rubber and a poly alpha-1,3-glucan ester compound as disclosed herein.

In one embodiment, a polysaccharide-elastomer masterbatch composition produced according to the methods disclosed herein comprises hydrogenated nitrile butadiene rubber and poly alpha-1,3-glucan. In another embodiment, the masterbatch composition comprises hydrogenated nitrile butadiene rubber and poly alpha-1,3-1,6-glucan. In yet another embodiment, the masterbatch composition comprises hydrogenated nitrile butadiene rubber and a poly alpha-1,3-glucan ester compound as disclosed herein.

In one embodiment, a polysaccharide-elastomer masterbatch composition produced according to the methods disclosed herein comprises polybutadiene and poly alpha-1,3-glucan. In another embodiment, the masterbatch composition comprises polybutadiene and poly alpha-1,3-1,6-glucan. In yet another embodiment, the masterbatch composition comprises polybutadiene and a poly alpha-1,3-glucan ester compound as disclosed herein.

In one embodiment, a polysaccharide-elastomer masterbatch composition produced according to the methods disclosed herein comprises neoprene and poly alpha-1,3-glucan. In another embodiment, the masterbatch composition comprises neoprene and poly alpha-1,3-1,6-glucan. In yet another embodiment, the masterbatch composition comprises neoprene and a poly alpha-1,3-glucan ester compound as disclosed herein.

In an additional embodiment, an alternative method of producing a polysaccharide-elastomer masterbatch composition is disclosed, the method comprising a step of physically mixing a polysaccharide with a rubber component to form a solid mixture, and drying the mixture to obtain the masterbatch composition. The polysaccharide can be used as wet cake or dry powder, and the rubber component can be used in solid form. The mixing can be performed using methods known in the art, for example by milling and extruding. In one embodiment of the method, drying the mixture is performed until the moisture content is below 3%. The physical mixing process can be conducted at room temperature after which the masterbatch is dried in an oven. Alternatively, the masterbatch can be prepared at high temperature, and water is removed during the mixing process. The polysaccharide and rubber component can each be as disclosed herein above, and the relative amounts are selected based on the desired end use application of the masterbatch.

A polysaccharide-elastomer masterbatch composition produced according to the methods disclosed herein is useful in preparing polysaccharide-elastomer compositions by compounding methods generally known in the rubber compounding art. The masterbatch composition can be used to prepare a polysaccharide-rubber composition for applications such as a pneumatic tire, which can be formed by vulcanization molding according to conventional methods. The tires can be built, shaped, molded and cured by various methods which will be readily apparent to those having skill in such art. The masterbatch compositions can also be used to form other articles which are also generally vulcanized, including but not limited to tire treads, tire sidewalls, conveyor belts, power transmission belts, hoses, gaskets, and footwear. The masterbatch compositions disclosed herein can also be used as coatings, films, or adhesives. In one embodiment, an article is produced using a polysaccharide-elastomer masterbatch composition as disclosed herein. In another embodiment, the article is a tire, a belt, a seal, footwear, a valve, tubing, a mat, a gasket, a coating, a film, or an adhesive. The use of polysaccharides in rubber compositions can provide advantages such as lower cost, low density, low energy consumption during processing, and better performance.

Non-limiting examples of the embodiments disclosed herein include:

1. A method of producing a polysaccharide-elastomer masterbatch composition, comprising a step of:
   a) mixing
      i) an aqueous polysaccharide dispersion, or
      ii) a basic aqueous polysaccharide solution,
   with a rubber latex solution containing a rubber component to form a mixture.

2. The method of embodiment 1, further comprising the steps of:
   b) coagulating the mixture obtained in step a) to produce a coagulated mass; and
   c) drying the coagulated mass obtained in step b).

3. The method of embodiment 2, wherein step b) coagulating the mixture comprises adding an inorganic salt to the mixture.

4. The method of embodiment 2 or 3, wherein the inorganic salt comprises LiCl, NaCl, KCl, $CaCl_2$, $MgCl_2$, $Al_2(SO_4)_3$, a zinc salt, sodium sulfate, potassium sulfate, trisodium phosphate, tripotassium phosphate, potassium pyrophosphate, sodium borate, or a combination thereof.

5. The method of embodiment 2, 3, or 4, wherein step b) coagulating the mixture comprises adding an acid to the mixture.

6. The method of embodiment 5, wherein the acid comprises acetic acid, sulfuric acid, nitric acid, boric acid, formic acid, an organic acid, or combinations thereof.

7. The method of embodiment 2, 3, 4, 5, or 6, wherein step c) drying the coagulated mass is performed while applying mechanical pressure.

8. A method of producing a polysaccharide-elastomer masterbatch composition, comprising a step of mixing a polysaccharide with a rubber component to form a solid mixture, and drying the mixture to obtain the masterbatch composition.

9. The method of embodiment 1, 2, 3, 4, 5, 6, 7, or 8, wherein the mixture comprises from about 20 weight percent to about 80 weight percent polysaccharide, based on the weight of polysaccharide and rubber component.

10. The method of embodiment 1, 2, 3, 4, 5, 6, 7, 8, or 9, wherein the polysaccharide comprises:
  i) poly alpha-1,3-glucan;
  ii) poly alpha-1,3-1,6-glucan;
  iii) water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000;
  iv) a poly alpha-1,3-glucan ester compound represented by Structure I:

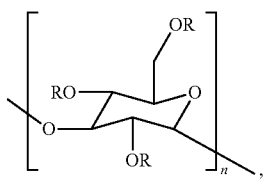

Structure I wherein
  (A) n is at least 6;
  (B) each R is independently an —H or a first group comprising —CO—$C_x$—COOH, wherein the —$C_x$— portion of said first group comprises a chain of 2 to 6 carbon atoms; and
  (C) the compound has a degree of substitution with the first group of about 0.001 to about 3.

11. The method of embodiment 1, 2, 3, 4, 5, 6, 7, 8, 9, or 10, wherein the polysaccharide of the aqueous polysaccharide dispersion is in the form of wet cake, colloidal dispersion, fibrids, dry powder, or a combination thereof.

12. The method of embodiment 1, 2, 3, 4, 5, 6, 7, 8, 9, 10, or 11, wherein the polysaccharide comprises particles having an average particle size in at least one dimension in the range of from about 20 nm to about 200 μm.

13. The method of embodiment 1, 2, 3, 4, 5, 6, 7, 8, 9, 10, 11, or 12, wherein the basic aqueous polysaccharide solution comprises NaOH, KOH, or a combination thereof.

14. The method of embodiment 1, 2, 3, 4, 5, 6, 7, 8, 9, 10, 11, 12, or 13, wherein the rubber component comprises at least one diene-based sulfur-vulcanizable or peroxide-vulcanizable elastomer having a Tg below −30° C., as determined by dynamic mechanical analysis.

15. The method of embodiment 1, 2, 3, 4, 5, 6, 7, 8, 9, 10, 11, 12, 13, or 14, wherein the elastomer comprises natural rubber, synthetic polyisoprene, styrene butadiene rubber, ethylene propylene diene monomer rubber, hydrogenated nitrile butadiene rubber, polybutadiene, or neoprene.

16. The method of embodiment 1, 2, 3, 4, 5, 6, 7, 8, 9, 10, 11, 12, 13, 14, or 15, wherein step a) mixing further comprises adding a filler.

17. The method of embodiment 1, 2, 3, 4, 5, 6, 7, 8, 9, 10, 11, 12, 13, 14, 15, or 16, wherein the filler comprises silica, carbon black, graphene, fullerene, carbon nanotubes, or mixtures thereof.

18. The method of embodiment 1, 2, 3, 4, 5, 6, 7, 8, 9, 10, 11, 12, 13, 14, 15, 16, or 17, further comprising adding at least one coupling agent.

19. The method of embodiment 1, 2, 3, 4, 5, 6, 7, 8, 9, 10, 11, 12, 13, 14, 15, 16, 17, or 18, wherein the at least one coupling agent comprises a silane, alkynyl succinic anhydride, alkylketene dimer, polyetheramine, maleic anhydride, or an isocyanate.

20. The method of embodiment 1, 2, 3, 4, 5, 6, 7, 8, 9, 10, 11, 12, 13, 14, 15, 16, 17, 18, or 19, further comprising adding a flocculant.

21. A polysaccharide-elastomer masterbatch composition produced according to the method of embodiment 1, 2, 3, 4, 5, 6, 7, 8, 9, 10, 11, 12, 13, 14, 15, 16, 17, 18, 19, or 20.

22. A masterbatch composition of embodiment 21, wherein the masterbatch composition comprises from about 20 weight percent to about 80 weight percent polysaccharide, based on the weight of polysaccharide and rubber component.

23. The masterbatch composition of embodiment 21 or 22, wherein the masterbatch composition further comprises a filler.

24. The masterbatch composition of embodiment 21, 22, or 23, wherein the polysaccharide comprises:
  i) poly alpha-1,3-glucan;
  ii) poly alpha-1,3-1,6-glucan;
  iii) water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000;
  iv) a poly alpha-1,3-glucan ester compound represented by Structure I:

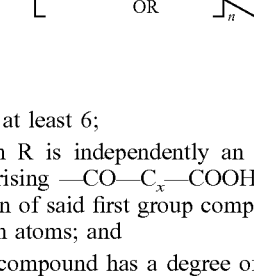

Structure I wherein
  (A) n is at least 6;
  (B) each R is independently an —H or a first group comprising —CO—$C_x$—COOH, wherein the —$C_x$— portion of said first group comprises a chain of 2 to 6 carbon atoms; and
  (C) the compound has a degree of substitution with the first group of about 0.001 to about 3.

25. The masterbatch composition of embodiment 21, 22, 23, or 24, wherein the rubber component comprises an elastomer comprising natural rubber, synthetic polyisoprene, styrene butadiene rubber, ethylene propylene diene monomer rubber, hydrogenated nitrile butadiene rubber, polybutadiene, or neoprene.

26. An article produced using the polysaccharide-elastomer masterbatch composition of embodiment 21, 22, 23, 24, or 25.

27. An article of embodiment 26, wherein the article is a tire, a belt, a seal, footwear, a valve, tubing, a mat, a gasket, a coating, a film, or an adhesive.

EXAMPLES

Unless otherwise noted, all materials were used as received.

As used herein, "Comp. Ex." Means Comparative Example; "Ex." means Example.

The Examples were prepared using the following materials: Amax® OBTS accelerator (N-oxydiethylene-2-benzothiazole-sulfenamide) and AgeRite® Resin D antioxidant (polymerized 1,2-dihydro-2,2,4-trimethylquinoline) (R. T. Vanderbilt Co., Norwalk, Conn.).; diphenyl guanidine (DPG) accelerator (Akrochem Corp., Akron, Ohio); BUNA VSL 4526-2 HM styrene-butadiene rubber (solution polymerized, 27.3% TDAE oil extended) (Lanxess, Orange, Tex.); Budene® 1207 (high-cis-polybutadiene) (Goodyear Chemical, Akron, Ohio); Vulcan® 7H N234 carbon black (Cabot, Alpharetta, Ga.); zinc oxide (US Zinc Corp.), Rubbermaker's Sulphur (Western Reserve Chemical), stearic acid (Harwick); HyPrene L2000 naphthenic process oil (Ergon Refining Inc., Jackson, Miss.); N-cyclohexyl-2-benzothiazole sulfonamide (CBS) accelerator (Solutia, Kingsport, Tenn.).

Representative Preparation of Poly Alpha-1,3-Glucan

Poly alpha-1,3-glucan can be prepared using a gtfJ enzyme preparation as described in U.S. Pat. No. 7,000,000; U.S. Patent Appl. Publ. No. 2013/0244288, now U.S. Pat. No. 9,080,195; and U.S. Patent Appl. Publ. No. 2013/0244287, now U.S. Pat. No. 8,642,757 (all of which are incorporated herein by reference in their entirety).

Poly alpha-1,3-glucan polymer can be synthesized, and wet cake thereof prepared, following the procedures disclosed in U.S. Appl. Publ. No. 2014/0179913, now U.S. Pat. No. 9,139,718 (see Example 12 therein, for example), both of which are incorporated herein by reference in their entirety.

Representative Preparation of Carboxymethyl Poly Alpha-1,3-Glucan

Carboxymethyl poly alpha-1,3-glucan can be prepared as disclosed in U.S. Pat. No. 9,139,718, which is incorporated herein by reference in its entirety.

Procedure for Preparing Rubber Compositions and Testing

In the following Examples and Comparative Examples, rubber compositions were prepared by mixing the indicated ingredients in several sequential nonproductive stages (without the sulfur and associated accelerator(s) curatives together) to temperatures of about 160° C. in an internal rubber compounder. This was then followed by a final mixing stage at a lower temperature of about 95° C. that involved the addition of curatives and antidegradants. The compounded material was then further homogenized with a two-roll mill to further improve the dispersion and reduce the aggregation of the polysaccharides in the rubber composites.

Materials prepared as described above were used for processibility testing including dynamic mechanical properties, and cure behavior. The homogenized material was further vulcanized/cured in a carver press compression mold at a temperature of about 160° C. and press pressure of 25,000 lbs. Cure times were evaluated according to ASTM 6204 using an RPA-2000 (Alpha technologies) oscillating disc rheometer with a temperature range of 23° C. to 230° C., oscillation amplitude of 0.005 deg to 90 deg of arc, and oscillation frequency of 0.1 to 2000. Using the cure time obtained with this procedure, fresh composition samples were loaded in the RPA, cured and cooled in the rheometer without taking out. Then strain sweep was done with the cured rubber at 60° C. in the strain range 0.3 to 100, from low to high and high to low, at 1 Hz frequency to measure the storage modulus (G') and Tan Delta. Rubber samples were compression molded at 160° C. under 500 psi pressure for a time equal to t98+5 minutes for tensile properties and hardness measurements. Tensile properties were measured according to ASTM D 412 06a, Method A, Die C and Shore A hardness were measured according to ASTM D624 and ASTM D 2240-05, respectively. Table 1 summarizes the test protocols used.

TABLE 1

Test Protocols Used to Characterize Rubber-Polysaccharide Compositions Prepared from the Masterbatch Compositions

| Test type | Method | Instrument |
|---|---|---|
| Shore A hardness | ASTM D2240 | Mitutoyo Digital Durometer |
| Tensile properties<br>Tensile Strength at Break<br>Modulus<br>Elongation<br>Energy under Stress-Strain Curve | ASTM D412 | Instron (Model 4202) |
| Tear properties (Die C) | ASTM D624 | Instron (Model 4202) |
| Din Abrasion | ASTM D 5963 | DIN Abrasion Tester (Qualitest) |
| Rebound | ASTM D2632 | Rebound resilience test stand (Zwick 5109) |
| RPA<br>Min torque (S')<br>Tan δ (60° C.)<br>Cure time | ASTM 6204 | RPA-2000 (Alpha technologies) |
| MDR T90 (Cure Rate mm) | ASTM D 2084 | Moving Die Rheometer (Gibitra Instruments) |
| Density | ASTM D297 | Electronic densimeter |

Typically, when an aqueous polysaccharide dispersion or solution is used to prepare a masterbatch composition, a portion of the polysaccharide is incorporated with the rubber component during the coagulation process, and a portion remains in the aqueous phase. The amount of polyalpha-1,3-glucan contained in the masterbatch composition can be determined using thermogravimetric analysis with a stepwise isothermal procedure, for example as disclosed in *Thermal Applications Note TN40: Optimizing Stepwise Isothermal Experiments in Hi-Res™ TGA* by TA Instruments.

Example 1A

Peparation of Polysaccharide-Natural Rubber Masterbatch Composition Using an Aqueous Polysaccharide Dispersion A polysaccharide-natural rubber masterbatch composition was prepared as follows: Wet cake poly alpha-1,3-glucan (250 g, 40% solids) was dispersed in water (1000 g) using a laboratory blender to give a homogeneous slurry. Natural rubber latex (Centrotrade Minerals & Metals Inc.) (166.7 g, 60% solids) was added all at once to the blender and mixed up with the glucan slurry. The mixture of polysaccharide slurry and natural rubber latex was coagulated by adding an aqueous solution containing calcium chloride (25 wt %) and acetic acid (5 wt %) with gentle stirring until the pH was between 5.7 and 5.3. The coagulated mass was collected and rinsed with water to remove residual acids and salt. The washed mass was then pressed to remove as much of the aqueous phase as possible. The pressed sample was chopped up into small pieces and dried at 55° C. in a vacuum oven under nitrogen purge to provide a masterbatch composition containing 50% polysaccharide (100 phr).

Example 1B

Preparation of Polysaccharide-Natural Rubber Masterbatch Composition Using a Basic Aqueous Polysaccharide Solution A polysaccharide-natural rubber masterbatch composition was prepared as follows: wet cake poly alpha-1,3-glucan (250 g, 40% solids) was dispersed in water (1000 g) using a laboratory blender to give a homogeneous slurry. Sodium hydroxide solution (50 wt %) was added to the slurry to give 4.5% NaOH concentration, and mixed well. The addition of NaOH completely solubilized the glucan. Natural rubber latex (166.7 g, 60% solids) was added to the blender and mixed up with the glucan solution. The pH of the mixture of the glucan solution and the natural rubber latex solution was first adjusted to pH 8.5 by adding concentrated acetic acid. Coagulation was then conducted by adding an aqueous solution containing calcium chloride (25 wt %) and acetic acid (5 wt %) with gentle stirring until the pH was between 5.7 and 5.3. The coagulated mass was collected and rinsed with water to remove residual acids and salt. The washed mass was then pressed to remove as much of the aqueous phase as possible. The pressed sample was chopped up into small pieces and dried at 55° C. in a vacuum oven under nitrogen purge to provide a masterbatch composition containing 50% polysaccharide (100 phr).

Comparative Example A

Preparation of Natural Rubber Masterbatch Composition

A coagulated natural rubber masterbatch composition which did not contain any polysaccharide was prepared from natural rubber latex (500 g, 60% solids). An aqueous coagulation solution containing calcium chloride (25 wt %) and acetic acid (5 wt %) was added to the natural rubber latex with gentle stirring until the pH was between 5.7 and 5.3. The coagulated natural rubber masterbatch composition was then washed and dried in a similar manner to that of the masterbatch compositions prepared in Example 1A and Example 1B.

The masterbatch compositions of Example 1A, Example 1B, and Comparative Example A were each used to prepare a compounded natural rubber composition according to the following procedure.

The ingredients listed in Table 2 were accurately weighed into an internal mixer (C.W. Brabender Prep-Mixer). The material was then mixed at 120-160° C. for 5-10 minutes at 85-100 rpm, then the internal mixer contents were cooled below 80° C. to allow incorporation of curatives without the risk of vulcanization in the internal mixer. This was done by stopping the rotor of the internal mixer and collecting the samples. The collected samples were then sliced up and loaded back into the mixer, and a curative package (sulfur, CBS, and DPG) was sprinkled in and mixed at 80-95° C., 45-55 rpm for 1-4 minutes. The material was further mixed and homogenized using an EEMCO 2 roll laboratory mill with 6 inch by 12 inch wide rolls. The final material was sheeted to a thickness of 2.0-2.2 mm. Plaques were cut from the sheet and compression molded at 160° C. to cure the rubber composition. Test specimens were then cut from the cured plaques for property testing of the cured rubber composition.

The masterbatch compositions of Examples 1A and 1B contain a 1:1 weight ratio of rubber elastomer to polysaccharide in dry form. Thus, the masterbatch compositions of Example 1A and 1B are composed of 100 phr of total rubber, and 100 phr of polysaccharide dispersion or polysaccharide solution, respectively. The compounded natural rubber formulations made using the masterbatch of Example 1A or Example 1B contained 20 phr poly alpha-1,3-glucan as the polysaccharide filler to replace an equivalent fraction of carbon black used in Comparative Example A. No polysaccharide was contained in the compounded natural rubber composition made from the masterbatch of Comparative Example A. The compounded natural rubber composition of Comparative Example A was composed of 75 phr carbon black. The compounded formulations of Examples 1A and 1B were composed of 100 phr of rubber and 75 phr filler—55 phr carbon black and 20 phr of polysaccharide dispersion for Example 1A, and 55 phr carbon black and 20 phr polysaccharide solution for Example 1B, respectively.

TABLE 2

Compounded Rubber Compositions Made Using the Masterbatch Compositions of Comparative Example A, Example 1A, and Example 1B

| Raw materials | Comp. Ex. A (phr) | Example 1A (phr) | Example 1B (phr) |
|---|---|---|---|
| Natural Rubber Masterbatch (Comp Ex A) | 100 | 80 | 80 |
| Glucan dispersion-Natural Rubber Masterbatch (Ex 1A) | 0 | 40 | 0 |
| Glucan solution-Natural Rubber Masterbatch (Ex 1B) | 0 | 0 | 40 |
| Carbon black | 75 | 55 | 55 |
| Silane coupling agent | 7 | 7 | 7 |
| Curative (zinc oxide) | 2.5 | 2.5 | 2.5 |
| Curative (stearic acid) | 2.0 | 2.0 | 2.0 |
| Curative (sulfur) | 2.0 | 2.0 | 2.0 |
| Accelerator CBS | 1.7 | 1.7 | 1.7 |
| Accelerator DPG | 2.0 | 2.0 | 2.0 |

After compounding was completed, it was observed that the polysaccharide based formulations (Example 1A and 1B) were coated well with the elastomers and as a result the cured compounds exhibited excellent visual appearance in the form of surface smoothness, homogeneity, and color/shininess. Despite the high loading of polysaccharides in the mixture with the latex, coagulation of the mixture derived from either the polysaccharide dispersion (Example 1A) or the basic aqueous polysaccharide solution (Example 1B) was not affected. Post coagulation, a clear supernatant solution with very little (<1%) to no solids was observed. In the preparation of the compounded composition, the rubber-polysaccharide masterbatch exhibited excellent processibility in the internal mixer. Table 3 summarizes the performance characteristics of the rubber compositions prepared from the masterbatch compositions of Comparative Example A, Example 1A, and Example 1B.

TABLE 3

Properties of Polysaccharide-Reinforced Rubber Compositions Made Using the Masterbatch Compositions of Comparative Example A, Example 1A, and Example 1B

| Property | Comp. Ex. A | Ex. 1A | Ex. 1B |
|---|---|---|---|
| Tensile strength at break (MPa) | 19.8 | 21.4 | 14.5 |
| Hardness (Shore A units) | 59.9 | 62.8 | 50.3 |
| Elongation at break (%) | 376.5 | 431.8 | 290 |
| Toughness (area under stress strain curve) (J) | 12.9 | 19.9 | 4.7 |
| Die C (N/mm) | 46.7 | 79.1 | 42.8 |
| Max tan δ (60° C.) | 0.32 | 0.24 | 0.21 |
| Cure time (min) | 12 | 15 | 12 |
| Rebound % (room temp) | 45.0 | 49.0 | 42.9 |
| Rebound % (0° C.) | 31.3 | 23.6 | 24.3 |
| Din abrasion (ARI, %) | 108.5 | 138.7 | 148.9 |
| Density (g/cc) | 1.15 | 1.12 | 1.12 |
| Min torque (S') (Nm) | 9.3 | 7.4 | 7.8 |

The following conclusions are drawn from the results in Table 3:

- Improvement in tensile and elongation was observed when polysaccharides were incorporated as a dispersion (Example 1A) in the masterbatch. This has resulted in a clear improvement (>50%) in toughness from the incumbent carbon black filled formulation (Comp. Ex. A.), calculated as the area under the stress strain curve, of the compound formulations. This could be as a result of better dispersion of polysaccharides as a reinforcing filler during the preparation of the masterbatch process, and an intimate interaction between the natural rubber and polysaccharides.
- Evaluation of tear properties also displayed that the incorporation of polysaccharides in natural rubber via a masterbatch process (Example 1A) has improved Die C by about 70% from the incumbent formulation (Comp. Ex. A). The use of solubilized polysaccharide (Example 1B) in the masterbatch has slightly reduced tear strength from that observed for Comp. Ex. A.
- In natural rubber formulations, masterbatch formulations based on polysaccharide dispersion (Example 1A) reduced tan δ at 60° C. by about 26% compared to that of Comparative Example A. The aqueous basic polysaccharide solution-masterbatch formulation (Example 1B) reduced tan δ60° C. by about 34%. This shows that the use of polysaccharides in rubber formulations has improved the hysteresis of the rubber compound.
- Improvement in rebound at room temperature observed for polysaccharide dispersion masterbatch based formulation is also correlated with lower hysteresis.
- Lower density was achieved in the polysaccharide formulated Examples 1A and 1B as compared to the incumbent formulation of Comparative Example A. This is desirable in various application platforms as lighter end products and components translate to energy saving for the end user.
- ower torque (min S') indicates that there is a decrease in viscosity of the polysaccharide formulated rubber compositions compared to that of the Comparative Example A carbon black formulation. The lower viscosity of the formulation shows an improvement in processibility.

Example 2A

Preparation of Polysaccharide-Styrene Butadiene Rubber Masterbatch Composition Using an Aqueous Polysaccharide Dispersion A polysaccharide-styrene butadiene rubber masterbatch composition was prepared as follows: Wet cake poly alpha-1,3-glucan (250 g, 40% solids) was dispersed in water (1000 g) using a laboratory blender to give a homogeneous slurry. Styrene butadiene rubber latex (142.9 g, 70% solids) was added to the blender and mixed up with the glucan slurry. The polysaccharide-latex mixture was coagulated by adding an aqueous solution containing calcium chloride (25 wt %) and acetic acid (5 wt %) with gentle stirring until the pH was between 5.7 and 5.3. The coagulated mass was collected and rinsed with water to remove residual acids and salt. The washed mass was then pressed to remove as much of the water as possible. The pressed sample was chopped up into small pieces and dried at 55° C. for 48 hours in a vacuum oven under nitrogen purge to provide a masterbatch containing 50% polysaccharide (100 phr).

Example 2B

Preparation of Polysaccharide-Styrene Butadiene Rubber Masterbatch Composition Using a Basic Aqueous Polysaccharide Solution A polysaccharide-styrene butadiene rubber masterbatch composition was prepared as follows: poly alpha-1,3-glucan (250 g, 40% solids) was dispersed in water (1000 g) using a laboratory blender to give a homogeneous slurry. Sodium hydroxide solution (50 wt %) was added to the slurry to give 4.5% NaOH concentration, and mixed well. The addition of NaOH completely solubilized the glucan. Styrene butadiene latex (142.9 g, 60% solids) was added all at once to the blender and mixed up with the glucan solution. The pH of the mixture of the glucan solution and the styrene butadiene rubber latex was first adjusted from 14 to pH 8.5 by adding concentrated acetic acid. Coagulation was then conducted by adding an aqueous solution containing calcium chloride (25 wt %) and acetic acid (5 wt %) with gentle stirring until the pH was between 5.7 and 5.3. The coagulated mass was collected and rinsed with water to remove residual acids and salt. The washed mass was then pressed to remove as much of the aqueous phase as possible. The pressed sample was chopped up into small pieces and dried at 55° C. for 48 hours in a vacuum oven under nitrogen purge to provide a masteratch composition containing 50% polysaccharide (100 phr).

Comparative Example B

Preparation of Styrene Butadiene Rubber Masterbatch Composition

A coagulated styrene butadiene rubber masterbatch composition which did not contain any polysaccharide was prepared from styrene butadiene rubber latex (500 g, 60% solids). An aqueous coagulation solution containing calcium chloride (25 wt %) and acetic acid (5 wt %) was added to the styrene butadiene rubber latex with gentle stirring until the pH was between 5.7 and 5.3. The coagulated styrene butadiene rubber masterbatch composition was then washed and dried in a similar manner to that of the masterbatch compositions prepared in Examples 2A and 2B.

The masterbatch compositions of Example 2A, Example 2B, and Comparative Example B were each used to prepare a compounded styrene butadiene rubber composition according to the following procedure.

The ingredients listed in Table 4 were accurately weighed into an internal mixer (C.W. Brabender Prep-Mixer). The material was then mixed at 120-160° C. for 5-10 minutes at 85-100 rpm, then the internal mixer contents were cooled below 80° C. to allow incorporation of curatives without the risk of vulcanization in the internal mixer. This was done by stopping the rotor of the internal mixer and collecting the samples. The collected samples were then sliced up, and loaded back into the mixer, and a curative package (sulfur, CBS, and DPG) was sprinkled in and mixed at 80-95° C., 45-55 rpm for 1-4 minutes. The material was further mixed and homogenized using an EEMCO 2 roll laboratory mill with 6 inch by 12 inch wide rolls. The final material was sheeted to a thickness of 2.0-2.2 mm. Plaques were cut from the sheet and compression molded at 160° C. to cure the rubber composition. Test specimens were then cut from the cured plaques for property testing of the cured rubber composition.

The masterbatch compositions of Examples 2A and 2B contain a 1:1 weight ratio of rubber elastomer to polysaccharide in dry form. Thus, the masterbatch compositions of Example 2A and 2B are composed of a total of 100 phr of rubber, and 100 phr of polysaccharide dispersion or polysaccharide solution, respectively. The compounded styrene butadiene rubber formulations made using the masterbatch of Example 2A or Example 2B contained 20 phr poly alpha-1,3-glucan as the polysaccharide filler to replace an equivalent fraction of carbon black used in Comparative Example B. No polysaccharide was contained in the compounded styrene butadiene rubber composition made from the masterbatch of Comparative Example B. The compounded styrene butadiene rubber composition of Comparative Example B was composed of 75 phr carbon black. The compounded formulations of Examples 2A and 2B were composed of 100 phr of rubber and 75 phr filler—55 phr carbon black and 20 phr of polysaccharide dispersion for Example 2A, and 55 phr carbon black and 20 phr polysaccharide solution for Example 2B, respectively.

TABLE 4

Compounded Rubber Compositions Made Using the Masterbatch Compositions of Comparative Example B, Example 2A, and Example 2B

| Raw materials | Comp. Ex. B (Phr) | Ex. 2A (Phr) | Ex. 2B (Phr) |
|---|---|---|---|
| Styrene Butadiene Masterbatch (Comp Ex B) | 100 | 80 | 80 |
| Glucan-Styrene Butadiene Masterbatch (Ex 2A) | 0 | 40 | 0 |
| Glucan-Styrene Butadiene Masterbatch (Ex 2B) | 0 | 0 | 40 |
| Carbon black | 75 | 55 | 55 |
| Silane coupling agent | 7 | 7 | 7 |
| Curative (zinc oxide) | 2.5 | 2.5 | 2.5 |
| Curative (stearic acid) | 2.0 | 2.0 | 2.0 |
| Curative (sulfur) | 2.0 | 2.0 | 2.0 |
| Accelerator CBS | 1.7 | 1.7 | 1.7 |
| Accelerator DPG | 2.0 | 2.0 | 2.0 |

Both the aqueous polysaccharide dispersion and the basic aqueous polysaccharide solution mixed well with the SBR latex, and resulted in good dispersion of the polysaccharides in the latex. Loading of polysaccharides at 100 phr of the latex (dry weight basis) did not affect the stability of the latex, and the polysaccharide particles were wetted well with the latex. As in the preparation of polysaccharide-natural rubber masterbatches, the SBR-polysaccharide masterbatch coagulation step resulted in a clear to slight hazy supernatant solution that contained less than 1% solids. Compounding of the polysaccharide-styrene butadiene rubber masterbatch resulted in a smooth, homogeneous and shiny compounded material. Table 5 summarizes the performance characteristics of the rubber compositions prepared from the masterbatch compositions of Comparative Example B, Example 2A, and Example 2B.

TABLE 5

Properties of Polysaccharide-Reinforced Rubber Compositions Made Using the Masterbatch Compositions of Comparative Example B, Example 2A, and Example 2B

| Property | Comp. Ex. B | Ex. 2A | Ex. 2B |
|---|---|---|---|
| Tensile strength at break (MPa) | 15.45 | 20.02 | 12.78 |
| Hardness (Shore A units) | 55.1 | 56.6 | 59.1 |
| Elongation at break (%) | 195.9 | 299.6 | 169.2 |
| Toughness (area under stress strain curve) (J) | 6.45 | 12.44 | 4.45 |
| Die C (N/mm) | 35.3 | 42.7 | 36.1 |
| Max tan δ (60° C.) | 0.22 | 0.20 | 0.21 |
| Cure time (min) | 17 | 16 | 20 |
| Rebound % (room temp) | 43.4 | 43.5 | 42.8 |
| Rebound % (0° C.) | 19.9 | 20.6 | 20.1 |
| Din abrasion (%) | 117.1 | 101.4 | 137.1 |
| Density (g/cc) | 1.16 | 1.13 | 1.13 |
| Min torque (S') (Nm) | 7.9 | 5.9 | 7.2 |

The following conclusions are drawn from the results in Table 5:

Use of the SBR masterbatch prepared using a polysaccharide dispersion (Example 2A) imparted a high degree of reinforcement to the cured SBR rubber compositions. Improvement in tensile strength and elongation at break resulted in about 93% toughness improvement with polysaccharide dispersion compared to the baseline.

Loading of 20 phr polysaccharide prepared through a masterbatch process (Example 2A) has also improved tear strength measured as Die C of the carbon black formulation (Comparative Example B) by about 22%.

The use of either glucan dispersion (Example 2A) or basic glucan solution (Example 2B) to prepare a masterbatch composition resulted in reduction of tan δ at 60° C. This means the hysteresis of the SBR compounded rubber compositions has been reduced compared to that of Comparative Example B.

Density reduction and improvement in processibility were also observed with the incorporation of polysaccharide as seen from the reduction of torque in the compounded rubber compositions prepared from the masterbatch compositions of Examples 2A and 2B, as compared to that for Comparative Example B.

Example 3

Preparation of Polysaccharide-Natural Rubber Masterbatch Composition Using an Aqueous Polysaccharide Dispersion with a Flocculant A polysaccharide-natural rubber masterbatch composition was prepared as follows: Wetcake poly alpha-1,3-glucan (250 g, 40% solids) was dispersed in water (1000 g) using a laboratory blender to give a homogeneous slurry. Carboxymethyl poly alpha-1,3-glucan (10 g) was added to the wet cake slurry as a flocculant and blended to give a homogeneous slurry. Natural rubber latex (Centrotrade Minerals & Metals Inc.) (166.7 g, 60% solids) was added all at once to the blender and mixed up with the glucan slurry. The mixture of polysaccharide slurry and natural rubber latex was coagulated by adding an aqueous solution containing calcium chloride (25 wt %) and acetic acid (5 wt %) with gentle stirring until the pH was between 5.7 and 5.3. The coagulated mass was collected and rinsed with water to remove residual acids and salt. The washed mass was then pressed to remove as much of the aqueous phase as possible.

The pressed sample was chopped up into small pieces and dried at 55° C. in a vacuum oven under nitrogen purge to provide a masterbatch composition containing 50% polysaccharide (100 phr).

Example 4

Preparation of Polysaccharide-Natural Rubber Masterbatch Composition Using a Two Roll Mill A polysaccharide-natural rubber masterbatch having a 50/50 polysaccharide to rubber composition was prepared as follows: Wetcake poly alpha-1,3-glucan (1280 g, 40 wt % solids) was mixed with natural rubber SMR CV60 (512 g, in the form of solid chunks) at room temperature on a 6" (diameter)×12" (face width) EEMCO two roll mill with no heating or cooling. The speed of the rear roller was 33 rpm and that of the front roller was 24 rpm. The glucan wetcake was passed into the mill with the natural rubber multiple times for approximately 1 h until all the polysaccharide was incorporated into the natural rubber composite. The natural rubber masterbatch was dried in an oven at 70° C. for 3 days and then stored for later use.

Comparative Example C

Preparation of a Natural Rubber Carbon Black Only Compound

A comparative example using natural rubber composites was prepared without a polysaccharide-containing masterbatch but with carbon black as the only filler. The masterbatch of Comparative Example C was prepared with the internal mixer as described in Comparative Example A.

The masterbatch compositions of Example 4 and Comparative Example C were used to prepare compounded natural rubber compositions as listed in Table 7 according to the procedure described in Comparative Example A. Table 8 summarizes the performance characteristics of the rubber compositions prepared from the masterbatch composition of Example 4 and Comparative Example C.

TABLE 7

Compounded Rubber Compositions Made Using the Masterbatch Compositions of Example 4 and Comparative Example C

| Raw materials | Comp. Ex. C (phr) | Example 4 (phr) |
| --- | --- | --- |
| Natural Rubber (SMR CV60) | 75 | 55 |
| Budene 1207 | 25 | 25 |
| Glucan-Natural Rubber Masterbatch (Ex. 4) | 0 | 40 |
| Carbon black | 75 | 55 |
| Silane coupling agent | 0 | 5 |
| Curative (zinc oxide) | 5 | 5 |
| Curative (stearic acid) | 1.5 | 1.5 |
| Curative (sulfur) | 1.2 | 1.2 |
| Accelerator CBS | 1.7 | 1.7 |
| Accelerator DPG | 2.0 | 2.0 |

TABLE 8

Properties of Polysaccharide-Reinforced Rubber Compositions Made Using the Masterbatch Compositions of Comparative Example C and Example 4

| Property | Comp. Ex. C | Ex. 4 |
| --- | --- | --- |
| Tensile strength at break (MPa) | 8.25 | 12.18 |
| Hardness (Shore A units) | 76.7 | 71.2 |
| Elongation at break (%) | 332.5 | 287.6 |
| Toughness (area under stress strain curve) (J) | 17.35 | 13.82 |
| Die C (N/mm) | 69.1 | 39.8 |
| Max tan δ (60° C.) | 0.36 | 0.19 |
| Cure time (min) | 8 | 12 |
| Rebound % (room temp) | 33.8 | 48.7 |
| Rebound % (0° C.) | 22.4 | 27.6 |
| Din abrasion (%) | 176.5 | 132.6 |
| Density (g/cc) | 1.16 | 1.15 |
| Min torque (S') (Nm) | 17.9 | 4.76 |

The following conclusions are drawn from the results in Table 8:
  Masterbatch formulations (Example 4) prepared by two roll milling reduced tan δ at 60° C. by about 47% compared to the carbon black only formulation in Comparative Example C. This shows that the use of polysaccharides in rubber formulations has improved the hysteresis of the rubber compound.
  Improvement in rebound at room temperature observed for polysaccharide dispersion masterbatch based formulation is also correlated with lower hysteresis.
  Lower torque (min S') indicates that there is a decrease in viscosity of the polysaccharide formulated rubber compositions compared to that of the Comparative Example C carbon black only formulation. The lower viscosity of the formulation shows an improvement in processibility.

What is claimed is:
1. A method of producing a composition, the method comprising:
  (a) mixing a rubber latex with an aqueous dispersion to form a mixture;
    wherein the aqueous dispersion is of
    (i) poly alpha-1,3-glucan, wherein the percentage of glycosidic linkages of the poly alpha-1,3-glucan that are alpha-1,3 is greater than or equal to 50%, or
    (ii) a poly alpha-1,3-glucan ester compound represented by Structure I:

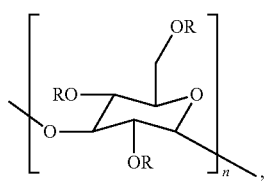

wherein
  (A) n is at least 6,
  (B) each R is independently an —H or a first group comprising —CO—C$_x$—COOH, wherein the —C$_x$— portion of said first group comprises a chain of 2 to 18 carbon atoms,
  (C) the poly alpha-1,3-glucan ester compound has a degree of substitution with the first group of about 0.001 to about 3.0, and (D) the percentage of glycosidic linkages of the poly alpha-1,3-glucan ester compound that are alpha-1,3 is greater than or equal to 50%;
wherein the rubber comprises at least one diene-based sulfur-vulcanizable or peroxide-vulcanizable elastomer;
(b) coagulating the mixture to produce a coagulated mass; and
(c) drying the coagulated mass.

2. The method of claim 1, wherein the drying of the coagulated mass comprises applying mechanical pressure to the coagulated mass.

3. The method of claim 1, wherein the coagulating of step (b) comprises adding an inorganic salt to the mixture, wherein the inorganic salt comprises LiCl, NaCl, KCl, $CaCl_2$, $MgCl_2$, $Al_2(SO_4)_3$, a zinc salt, sodium sulfate, potassium sulfate, trisodium phosphate, tripotassium phosphate, potassium pyrophosphate, sodium borate, or a combination thereof.

4. The method of claim 1, wherein the coagulating of step (b) comprises adding an acid to the mixture, wherein the acid comprises acetic acid, sulfuric acid, nitric acid, boric acid, formic acid, an organic acid, or a combination thereof.

5. The method of claim 1, wherein the aqueous dispersion is of said poly alpha-1,3-glucan.

6. The method of claim 1, wherein the poly alpha-1,3-glucan or the poly alpha-1,3-glucan ester compound is in the form of a wet cake or colloidal dispersion.

7. The method of claim 1, wherein the at least one diene-based sulfur-vulcanizable or peroxide-vulcanizable elastomer has a Tg below −30° C., as determined by dynamic mechanical analysis.

8. The method of claim 1, wherein the rubber comprises synthetic polyisoprene, styrene butadiene rubber, ethylene propylene diene monomer rubber, hydrogenated nitrile butadiene rubber, polybutadiene, or neoprene.

9. The method of claim 1, wherein the mixing of step (a) further comprises adding a filler that comprises silica, carbon black, graphene, fullerene, carbon nanotubes, or a mixture thereof.

10. The method of claim 1, wherein the mixing of step (a) further comprises adding at least one coupling agent that comprises a silane, alkenyl succinic anhydride, alkylketene dimer, polyetheramine, maleic anhydride, methylene diphenyl diisocyanate, or a mixture thereof.

11. The method of claim 1, wherein the rubber comprises natural rubber.

12. The method of claim 5, wherein the percentage of glycosidic linkages of the poly alpha-1,3-glucan that are alpha-1,3 is greater than or equal to 90%.

13. The method of claim 5, wherein the poly alpha-1,3-glucan is in the form of fibrids.

14. The method of claim 1, wherein the aqueous dispersion is of said poly alpha-1,3-glucan ester compound.

15. The method of claim 14, wherein the percentage of glycosidic linkages of the poly alpha-1,3-glucan ester compound that are alpha-1,3 is greater than or equal to 90%.

16. The method of claim 14, wherein the $—C_x—$ portion of said first group comprises a chain of 2 to 6 carbon atoms.

17. The method of claim 1, wherein the mixing of step (a) further comprises mixing a flocculant with the rubber latex and the aqueous dispersion, wherein the flocculant comprises a cationic polymer or anionic polymer.

18. The method of claim 17, wherein the flocculant comprises carboxymethyl poly alpha-1,3-glucan.

* * * * *